(12) United States Patent
Lee et al.

(10) Patent No.: US 11,308,310 B2
(45) Date of Patent: Apr. 19, 2022

(54) ELECTRONIC DEVICE INCLUDING IMAGE SENSOR AND METHOD OF OPERATING THE SAME

(71) Applicant: SAMSUNG ELECTRONICS CO., LTD., Suwon-si (KR)

(72) Inventors: Jineui Lee, Suwon-si (KR); Youngmin Seo, Suwon-si (KR); Yongcheol Park, Suwon-si (KR); Youngsoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/824,980

(22) Filed: Mar. 20, 2020

(65) Prior Publication Data

US 2020/0302148 A1 Sep. 24, 2020

(30) Foreign Application Priority Data

Mar. 21, 2019 (KR) .................. 10-2019-0032601
Sep. 24, 2019 (KR) .................. 10-2019-0117611

(51) Int. Cl.
*G06K 9/00* (2006.01)

(52) U.S. Cl.
CPC ....... *G06K 9/00046* (2013.01); *G06K 9/0008* (2013.01); *G06K 9/00114* (2013.01)

(58) Field of Classification Search
CPC ............. G06K 9/00046; G06K 9/0008; G06K 9/00114; G06K 9/0004; G06K 9/0012
See application file for complete search history.

(56) References Cited

U.S. PATENT DOCUMENTS

| 2009/0095912 | A1 | 4/2009 | Slinger et al. |
| 2017/0091506 | A1 | 3/2017 | Sinha et al. |
| 2017/0270342 | A1* | 9/2017 | He ............... G06F 21/32 |
| 2018/0211078 | A1 | 7/2018 | Lillie et al. |
| 2019/0034020 | A1 | 1/2019 | He et al. |
| 2019/0102595 | A1 | 4/2019 | Lee et al. |

(Continued)

FOREIGN PATENT DOCUMENTS

| JP | 2000-259821 | 9/2000 |
| JP | WO18-003124 A1 | 1/2018 |

(Continued)

OTHER PUBLICATIONS

International Search Report and Written Opinion dated Jul. 2, 2020 in counterpart International Application No. PCT/KR2020/003964.

*Primary Examiner* — Abhishek Sarma
(74) *Attorney, Agent, or Firm* — Nixon & Vanderhye P.C.

(57) ABSTRACT

An electronic device according to various embodiments may include an image sensor including a plurality of photodiodes, a display including a plurality of patterned openings, and a processor. The processor may be configured to control the electronic device to: acquire, through the image sensor, a first image using a plurality of incident light beams for a subject which pass through at least one of the plurality of openings, at least some of the plurality of incident light beams overlapping each other; acquire a second image representing the subject from the first image using a transfer function corresponding to the plurality of openings; and acquire information on the subject using the second image.

19 Claims, 21 Drawing Sheets

(56) References Cited

U.S. PATENT DOCUMENTS

| | | |
|---|---|---|
| 2019/0228204 A1 | 7/2019 | Park et al. |
| 2020/0007733 A1 | 1/2020 | Shimizu et al. |
| 2020/0065545 A1 | 2/2020 | Ahn et al. |

FOREIGN PATENT DOCUMENTS

| | | |
|---|---|---|
| KR | 10-2008-0021040 A | 3/2008 |
| KR | 10-2018-0001904 | 1/2018 |
| KR | 10-2019-0037728 | 4/2019 |
| KR | 10-2019-0100839 A | 8/2019 |
| KR | 10-2020-0022077 A | 3/2020 |
| WO | 2019/066226 | 4/2019 |

* cited by examiner (a) (b) (c) (d) (e)

ELECTRONIC DEVICE INCLUDING IMAGE SENSOR AND METHOD OF OPERATING THE SAME

CROSS-REFERENCE TO RELATED APPLICATIONS

This application is based on and claims priority under 35 U.S.C. § 119 to Korean Patent Application No. 10-2019-0032601, filed on Mar. 21, 2019, in the Korean Intellectual Property Office, and Korean Patent Application No. 10-2019-0117611, filed on Sep. 24, 2019, in the Korean Intellectual Property Office, the disclosures of which are incorporated by reference herein in their entireties.

BACKGROUND

Field

The disclosure relates to an electronic device including an image sensor and a method of operating the same.

Description of Related Art

In general, an electronic device may refer to a device that performs a specific function according to a program incorporated therein, such as an electronic scheduler, a portable multimedia reproducer, a mobile communication terminal, a tablet PC, an image/sound device, a desktop/laptop PC, or a vehicular navigation system, as well as a home appliance. The above-mentioned electronic devices may output, for example, information stored therein as sound or an image. As the integration degree of such electronic devices has increased and super-high speed and large-capacity wireless communication has become popular, various functions have recently been provided in a single mobile communication terminal. For example, various functions, such as an entertainment function (e.g., a game function), a multimedia function (e.g., a music/video reproducing function), a communication and security function for mobile banking, a schedule management function, and an e-wallet function, are integrated in a single electronic device, in addition to a communication function.

Recently, in addition to a privacy protection function stored in an electronic device, security functions necessary for executing mobile banking, a mobile credit card, an electronic wallet, or the like are installed in an electronic device, for example, a portable electronic device such as a mobile communication terminal. Security functions installed in an electronic device may include, for example, user authentication based on a password or a lock pattern set by a user and user authentication executed via a security company. These authentication methods may have a low level of security due to a high possibility of leakage of the password, or may be troublesome due to the intervention of the security company. As an alternative to these methods, a biometric authentication method, such as a user authentication method using fingerprint or iris recognition, may enhance use convenience while securing a higher level of security.

The user authentication method through fingerprint recognition includes a method using an optical structure, an ultrasonic method, or the like. This is a method of detecting a fingerprint image of a user from the light or ultrasound reflected from the user fingerprint by irradiating the user fingerprint with illumination or ultrasound. As another type, a capacitive fingerprint recognition sensor using an electrode array including a plurality of electrodes arranged therein may be proposed. In the capacitive fingerprint recognition sensor, the electrodes are capable of forming a capacitance with a subject (e.g., at least a portion of a user fingerprint (e.g., ridge portions or valley portions).

An optical structure for detecting a subject (e.g., a user fingerprint) image may include various types of structures for guiding and aligning light incident on a sensor layer. For example, a biometric sensor having an optical structure (e.g., a fingerprint sensor) may include a prism, a pin hole array, a liquid crystal cell array, a micro lens array, or the like. An optical sensor having an optical structure including a prism may be usefully used for access management of a specific place such as for a door lock, but a refractive lens may be difficult to mount in a miniaturized electronic device such as a mobile communication terminal. The pinhole array, the liquid crystal cell array, the micro lens array or the like may be easy to mount in a miniaturized electronic device, but it may be difficult to detect an image that sufficiently contains information required for user authentication. For example, an optical sensor having an optical structure including a pinhole array requires proper spacing between pinholes in order to provide an environment in which the superposition of light-based object information can be excluded, but it is difficult to secure such an environment in a limited space of an electronic device. The same may also be applicable to an optical sensor having an optical structure including a liquid crystal cell array and a micro lens array.

SUMMARY

Embodiments of the disclosure may provide an electronic device capable of acquiring an image in which subject information (e.g., incident light) overlaps and identifying a subject through the acquired image and a method of operating the electronic device.

Embodiments of the disclosure may provide an electronic device capable of being miniaturized and capable of identifying biometric information (e.g., a fingerprint) required for user authentication and a method of operating the electronic device.

An electronic device according to various example embodiments may include: an image sensor including a plurality of photodiodes, a display including a plurality of patterned openings, and a processor. The processor may be configured to control the electronic device to: acquire, through the image sensor, a first image using a plurality of incident light beams for a subject which pass through at least one of the plurality of openings, at least some of the plurality of incident light beams overlapping each other; acquire a second image representing the subject from the first image using a transfer function corresponding to the plurality of openings; and acquire information on the subject using the second image.

A method of operating an electronic device according to various example embodiments may include: acquiring, through an image sensor of the electronic device, a first image using a plurality of incident light beams for a subject which pass through at least one of a plurality of patterned openings of a display included in the electronic device, at least some of the plurality of incident light beams overlapping each other; acquiring a second image representing the subject from the first image using a transfer function corresponding to the plurality of openings; and acquiring information on the subject using the second image.

A non-transitory computer-readable recording medium according to various example embodiments may store a program that when executed, causes an electronic device to perform operations comprising: acquiring, through an image sensor of an electronic device, a first image using a plurality of incident light beams for a subject which pass through at least one of a plurality of patterned openings of a display included in the electronic device, at least some of the plurality of incident light beams overlapping each other; acquiring a second image representing the subject from the first image using a transfer function corresponding to the plurality of openings; and acquiring information on the subject using the second image.

An electronic device according to various example embodiments is identifying a subject while allowing superposition of subject information (e.g., incident light), which makes it possible to miniaturize the electronic device and to acquire biometric information (e.g., a user fingerprint) required for user authentication.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
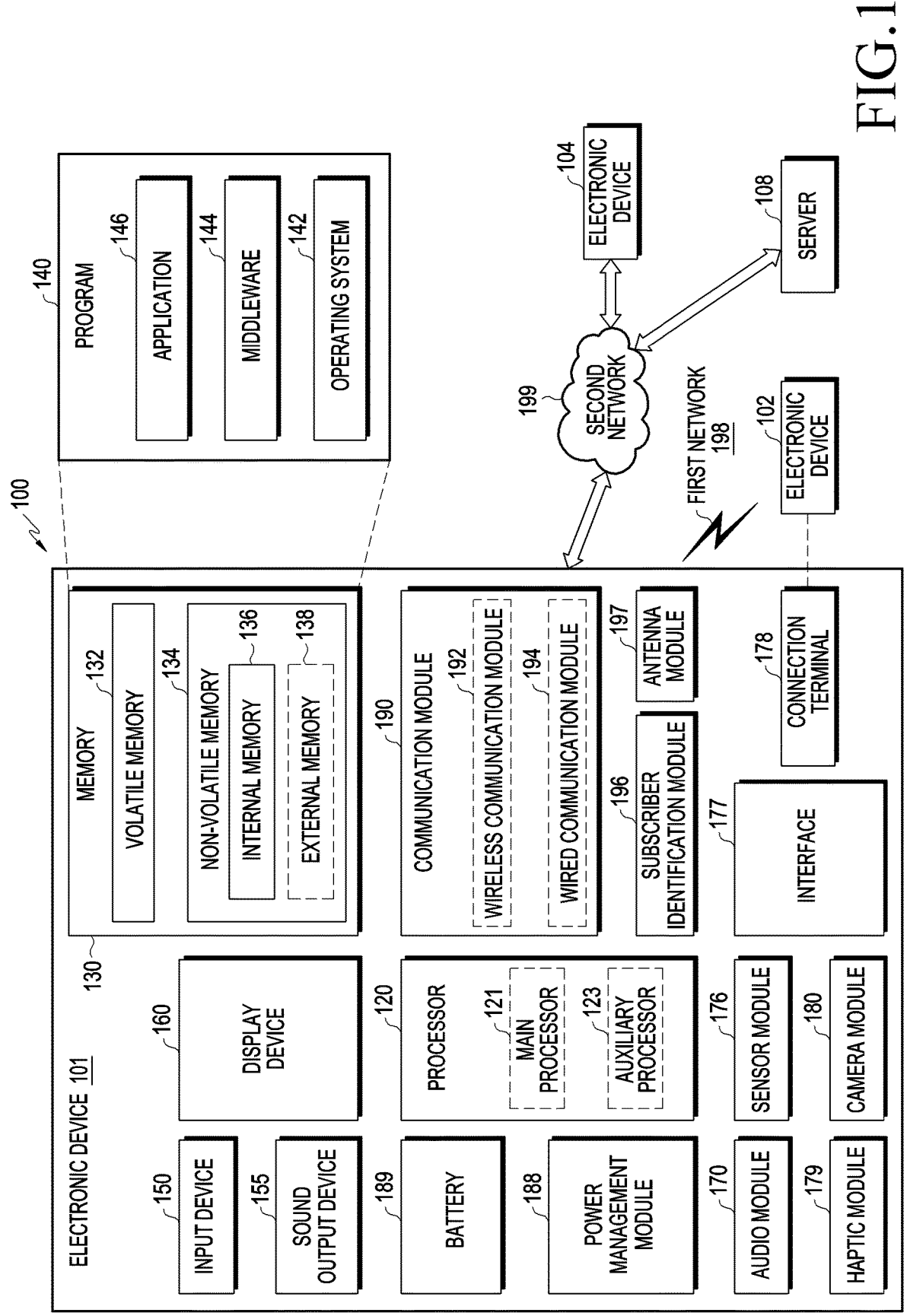
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
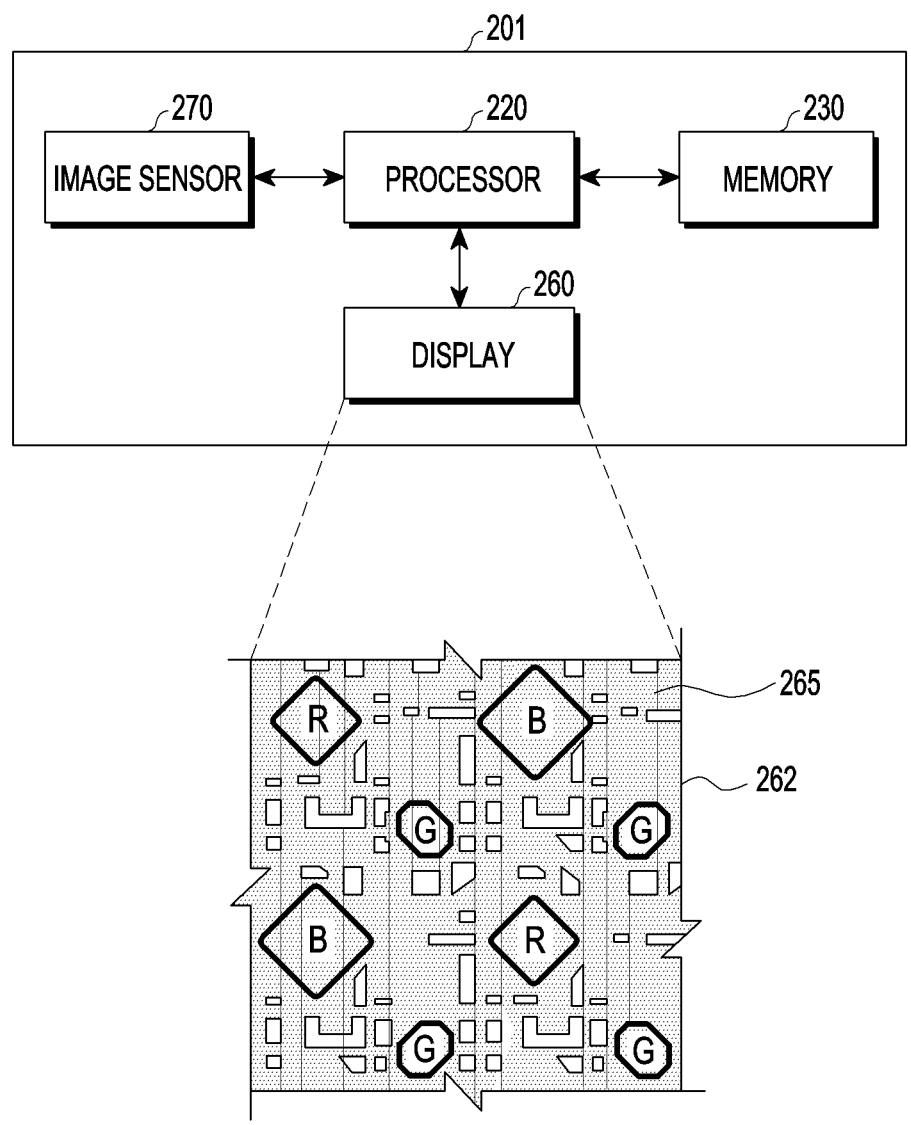
FIG. 2 is a block diagram illustrating an example electronic device according to various embodiments.

FIG. 2 is a block diagram illustrating an example electronic device according to various embodiments.

Referring to FIG. 2, an electronic device 201 may include a processor (e.g., including processing circuitry) 220, memory 230, a display 260, and an image sensor 270.

According to various embodiments, the electronic device 201 may be implemented to be substantially the same as or similar to the electronic device 101 of FIG. 1.

According to various embodiments, the processor 220 may include various processing circuitry control the overall operation of the electronic device 201. For example, the processor 220 may be implemented to be substantially the same as or similar to the processor 120 of FIG. 1.

According to various embodiments, the processor 220 may acquire an image using light beams for a subject, which pass through the openings of the display 260, and may obtain information about the subject from the acquired image. For example, the subject may include a two-dimensional or three-dimensional object.

According to various embodiments, the processor 220 may acquire, via the image sensor 270, a first image using a plurality of incident light beams for the subject, which pass through at least one of the plurality of openings included in the display 260. For example, the processor 220 may acquire, via the image sensor 270, the first image, based on light beams filtered by the pattern 265 (e.g., a void pattern) of coded openings of the display 260.

According to various embodiments, the "first image" may refer, for example, to an image generated by information of light beams filtered by a coded pattern (e.g., a void pattern) formed by a plurality of openings of a circuit unit 262 including a plurality of pixels of the display 260 after being reflected by a subject, and may be different from an image of the actual subject (e.g., an image identified with the naked eye). For example, the first image may be in the state in which incident light beams received from the subject overlap each other, and may be different from an image of an actual subject.

According to various embodiments, the processor 220 may acquire a transfer function corresponding to the plurality of openings of the display 260 (or the pattern 265 of the plurality of openings). The processor 220 may store the transfer function in the memory 230. A method of acquiring a transfer function by the processor 220 will be described in greater detail below.

According to various embodiments, the transfer function may be a value or function corresponding to a coded pattern (or a void pattern) 265 formed by the plurality of openings of the display 260. For example, the transfer function may be a value or function indicating a relationship between the coded pattern formed by the plurality of openings of the display 260 and the first image acquired through the image sensor 270. For example, the transfer function may be a value or function for the extent to which the information of light beams (e.g., brightness information) are filtered by the coded pattern 265 formed by the plurality of openings of the circuit unit 262 of the display 260. The transfer function may refer, for example, to a value or a function for the degree to which at least some of a plurality of incident light beams filtered by the coded pattern 265 formed by the plurality of openings overlap each other.

According to various embodiments, the processor 220 may acquire a second image indicating the subject from the first image using a transfer function corresponding to the plurality of openings of the display 260 (or the coded pattern 265 formed by the plurality of openings). For example, the second image may be the same as or similar to an image of an actual subject (e.g., an image identified with the naked eye).

According to various embodiments, the processor 220 may obtain information about the subject using the second image. For example, the processor 220 may check a fingerprint using the second image. The processor 220 may check the motion of the subject using the second image (e.g., one or more second images).

According to various embodiments, the memory 230 (e.g., the memory 130 in FIG. 1) may store data or information of the electronic device 201. For example, the memory 230 may store the transfer function indicating a relationship between the coded pattern 265 formed by the plurality of openings of the display 260 and the first image acquired through the image sensor 270.

According to various embodiments, the display 260 (e.g., the display device 160 in FIG. 1) may be configured to display the information of the electronic device 201 thereon.

According to various embodiments, the display 260 may output light beams to a subject located thereon. The light beams output to the subject may be reflected by the subject and may be received by the image sensor 270 after passing through at least one of the plurality of openings of the display 260.

According to various embodiments, the display 260 may include a circuit unit 262 including, for example, glass and a plurality of pixels. For example, the plurality of pixels may include organic light-emitting diodes (OLEDs), but the disclosure is not limited thereto.

According to various embodiments, the circuit unit 262 may, for example, be implemented as an array of elements that emit light by themselves or pixels (e.g., red (R), green (G), and blue (B) pixels). For example, the elements that emit light by themselves or the pixels may include, for example, and without limitation, an organic light-emitting diodes (OLEDs).

According to various embodiments, the circuit unit 262 may include elements that emit light R, G, and B, lines associated with the elements, and a plurality of openings which are spaces between the elements R, G, and B and the lines. For example, the plurality of openings may form a linear and/or nonlinear pattern 265. For example, the circuit unit 262 may have a structure having a linear and/or non-linear pattern formed by a plurality of openings. In this case, the pattern 265 of the circuit unit 262 may block or transmit light incident on the image sensor 270 after being reflected by the subject. For example, the pattern 265 of the circuit unit 262 is formed by a predetermined logic such that the light-emitting elements R, G, and B emit light, and may be coded.

According to various embodiments, the image sensor 270 (e.g., the sensor module 176 in FIG. 1) may output a signal (e.g., an electrical signal) related to an image, based on light (or incident light) received from the outside. For example, the image sensor 270 may include a plurality of photodiodes.

According to various embodiments, the image sensor 270 may receive light passing through at least one of the plurality of openings of the display 260 (e.g., the coded pattern 265 formed by the plurality of openings). The image sensor 270 may output a signal corresponding to the received light. The processor 220 may generate (or acquire) the first image using the signal output by the image sensor 270.

According to various embodiments, the image sensor 270 may be embedded in a display panel of the display 260 or may be disposed in a stacked structure with the display panel. For example, the image sensor 270 may be brought into direct contact with (or stacked on) the lower end portion of the display 260. For example, the image sensor 270 may be brought into direct contact with (or stacked on) the display 260 without a separate light-collecting layer. Accordingly, without a separate light-collecting layer, the image sensor 270 may receive light reflected by the subject and passing through at least one of the plurality of openings of the display 260 (e.g., the coded pattern 265 formed by the plurality of openings).

The void pattern 265 of FIG. 2 is illustrated as a non-limiting example for convenience of description, and the shape or form of the void pattern 265 may not be limited thereto.

In the following description, the operations performed by the electronic device may be interpreted as the operations of the electronic device controlled by the processor.

Figure 3:
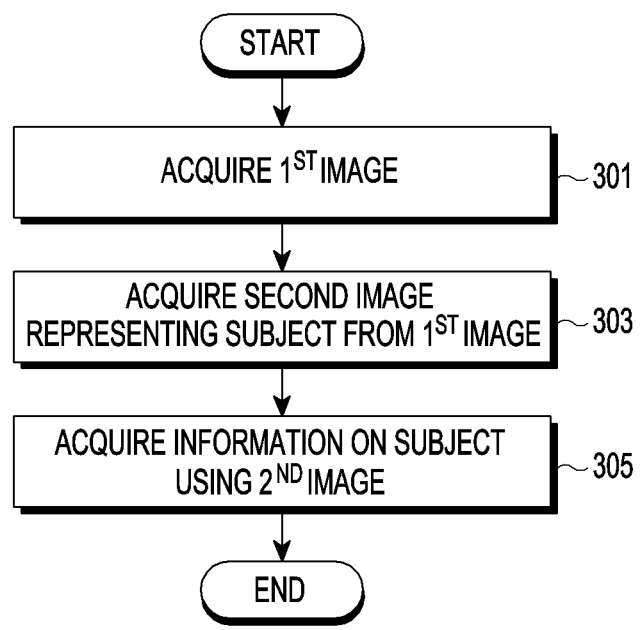
FIG. 3 is a flowchart illustrating an example method of restoring an image by an electronic device according to various embodiments.

FIG. 3 is a flowchart illustrating an example method of restoring an image by an electronic device according to various embodiments.

Referring to FIG. 3, in operation 301, an electronic device (e.g., the controller 201 in FIG. 2) may acquire a first image. For example, when a subject is located on a display (e.g., the display 260 in FIG. 2), the electronic device 201 may receive light reflected by the subject and passing through at least one of the plurality of openings of the display 260 (e.g., a coded pattern formed by the plurality of openings). The electronic device 201 may acquire the first image, based on the received light. In this case, the first image may be different from the image of an actual subject.

In operation 303, the electronic device 201 may acquire a second image representing the subject from the first image. For example, the electronic device 201 may generate (or acquire) a second image representing a subject from the first image using a transfer function stored in memory (e.g., the memory 230 in FIG. 2).

According to various embodiments, the electronic device 201 may generate the second image from the first image using, for example, a compressive sensing scheme. For example, the second image may be restored from the first image by calculating a "regularized linear inverse problem". For example, as in Equation 1 below, when the value is x by the image sensor 270 and the transfer function is A, the value corresponding to the image of the subject to be restored may be x' (a and b are constants), $$x'=\operatorname{argmin}\|Ax-b\|_2^2+a^2\|x\|_2^2 \qquad \text{Equation 1}$$

In operation 305, the electronic device 201 may acquire information on the subject using the second image. For example, when the subject is a finger, the electronic device 201 may identify the fingerprint of the finger using the second image. In addition, the electronic device 201 may identify valleys and peaks of the fingerprint of the finger using the second image. When the subject is a specific object, the electronic device 201 may obtain information on the specific object (e.g., information on the shape, pattern, material, color, brightness, size, or the like) using the second image.

According to various embodiments, the electronic device 201 may acquire at least one second image and may identify the motion of the subject. For example, when the subject is a moving object, the electronic device 201 may identify the motion or activity of the subject using the second image.

Figure 4:
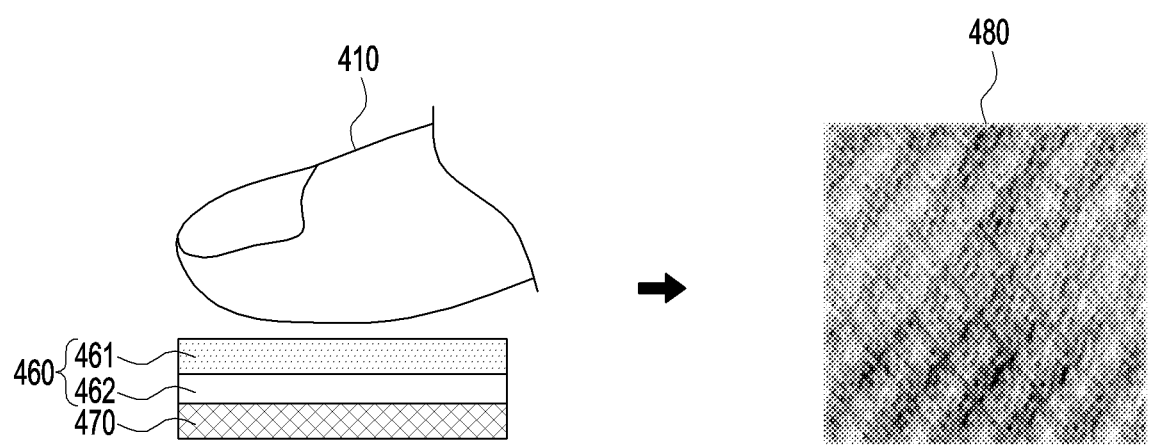
FIG. 4 is a diagram illustrating an example operation of acquiring a first image by an electronic device according to various embodiments.

FIG. 4 is a diagram illustrating an example operation of acquiring a first image by an electronic device according to various embodiments.

Referring to FIG. 4, a display 460 and an image sensor 470 in FIG. 4 correspond to parts of the display 260 and the image sensor 270 in FIG. 2. The display 460 and the image sensor 470 in FIG. 4 may be implemented to be substantially the same as the display 260 and the image sensor 270 in FIG. 2.

According to various embodiments, the display 460 may be in direct contact with the image sensor 470. The display 460 may be stacked on top of the image sensor 470. The display 460 may include, for example, a transparent glass plate 461 and a circuit unit 462. For example, the transparent glass plate 461 may be stacked on top of the circuit unit 462.

According to various embodiments, when a subject 410 is positioned on the glass plate 461, the light beams reflected by the subject may be filtered by the circuit unit 462 and may be received by the image sensor 470. The electronic device (e.g., the electronic device 201 in FIG. 2) may acquire a first image 480 using light beams received via the image sensor 470. In this case, the first image 480 may be generated when light beams reflected from the subject overlap each other. Accordingly, the first image 480 may have a cloudy shape and may be different from the actual image of the subject.

Figure 5:
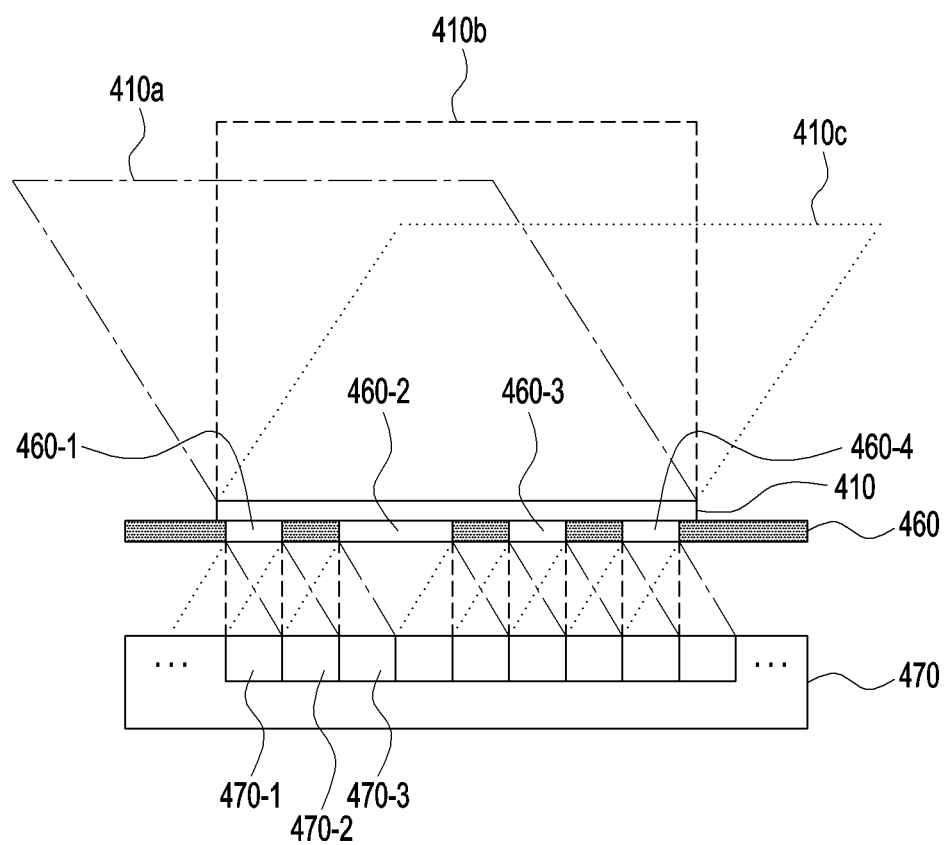
FIG. 5 is a diagram illustrating an example operation of acquiring a first image by an electronic device according to various embodiments.

FIG. 5 is a diagram illustrating an example operation of acquiring a first image by an electronic device according to various embodiments.

According to various embodiments of the disclosure, referring to FIG. 5, the subject 410 and/or the first image of the subject 410 placed on the display 460 may have various shapes depending on angles at which light beams are incident. For example, the subject 410 and/or the first image of the subject 410 may have a first shape 410a, a second shape 410b, and a third shape 410c, which are different from each other in terms of shape, brightness, color, size, and pattern.

According to various embodiments, the light beams reflected by the subject 410 may pass through the display 460 (e.g., the glass plate 461 and the circuit unit 462) and be received by the image sensor 470. For example, the light beams reflected by the subject 410 are received by the image sensor 470 through the plurality of openings 460-1, 460-2, 460-3, and 460-4 of the display 460.

According to various embodiments, one or more light beams passing through the plurality of openings 460-1, 460-2, 460-3, and 460-4 may overlap each other. According to various embodiments, one or more signals corresponding to one or more light beams passing through the plurality of openings 460-1, 460-2, 460-3, and 460-4 acquired by the image sensor 470 may overlap each other.

According to various embodiments, the image sensor 470 may include a plurality of photodiodes. For example, the first photodiode 470-1 may receive a light beam corresponding to the second shape 410b through the first opening 460-1. In this case, the first photodiode 470-1 may not acquire overlapping light beams. The second photodiode 470-2 may receive a light beam corresponding to the first shape 410a through the first opening 460-1, and may receive a light beam corresponding to the third shape 410c through the second opening 460-2. In this case, the second photodiode 470-2 may acquire overlapping light beams. The third photodiode 470-3 may receive a light beam corresponding to the second shape 410b through the second opening 460-2, and may receive a light beam corresponding to the third shape 410c through the third opening 460-3. In this case, the third photodiode 470-3 may acquire overlapping light beams. Since the signals acquired through the second photodiode 470-2 and the third photodiode 470-3 are signals based on light beams overlapping each other, the signals may be different from the signals representing the actual shape of the subject 410. Accordingly, the first image (the first image 480 in FIG. 4) may be an image different from the actual image of the subject 410.

Although FIG. 5 illustrates a display having a limited number of openings for convenience of description, the number or locations of the openings and the number or shape of the light beams incident through the openings may not be limited thereto and may be implemented in various forms, which can be modified in various forms by a person ordinarily skilled in the art. In addition, the shapes of the subjects illustrated in FIG. 5 are provided for convenience of description, and the technical spirit of the disclosure may not be limited thereto.

Figure 6A:
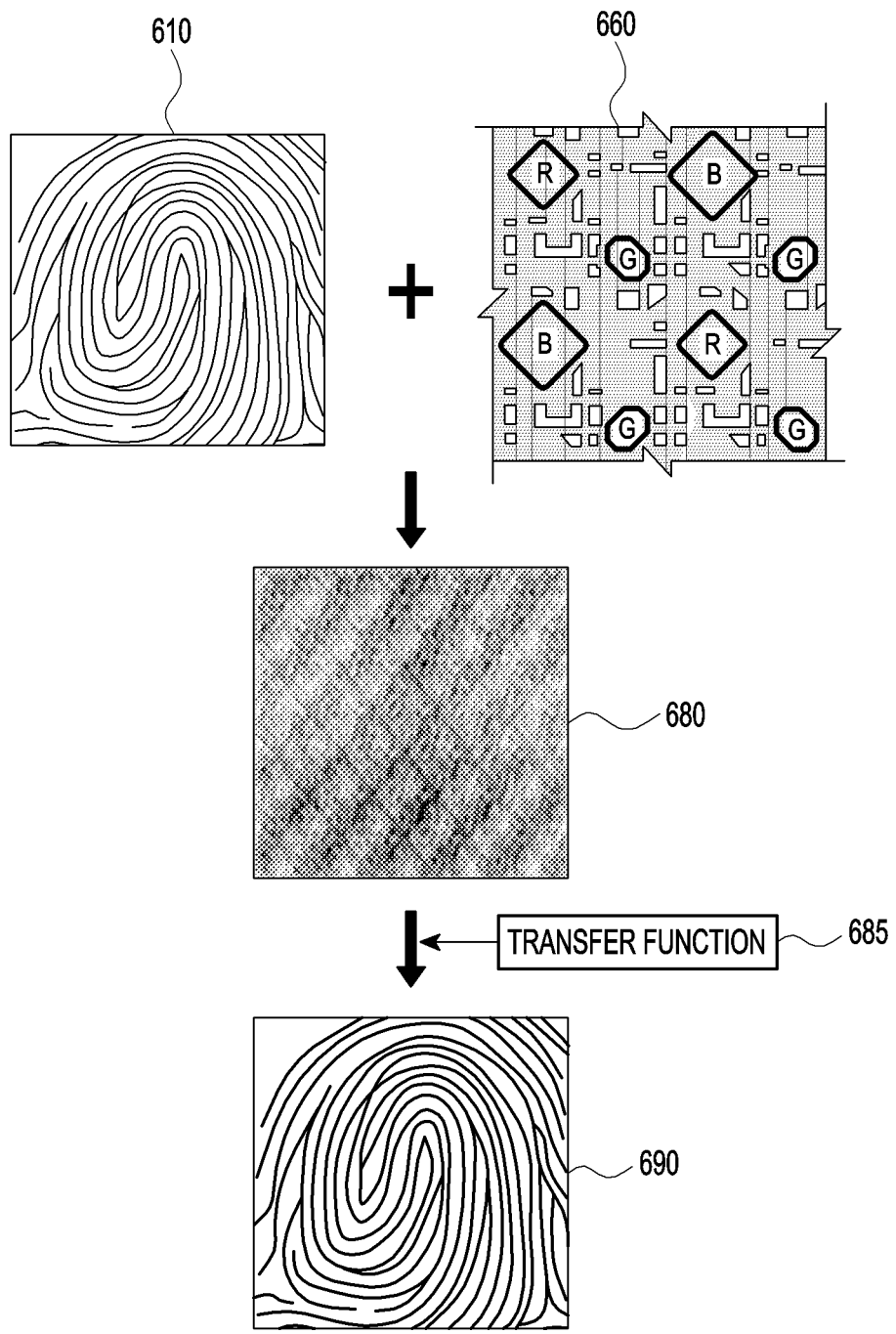
FIG. 6A is a diagram illustrating an example method of restoring an image by an electronic device according to various embodiments.

FIG. 6A is a diagram illustrating an example method of restoring an image by an electronic device according to various embodiments.

Referring to FIG. 6A, when a subject is positioned on a display (the display 260 in FIG. 2), the electronic device (e.g., the electronic device 201 in FIG. 2) may acquire a first image 680 through an image sensor (the image sensor in FIG. 2).

According to various embodiments, the electronic device 201 may acquire a first image 680 in which an actual image 610 of a subject and an image 660 of a void pattern of a circuit unit (the circuit unit 262 in FIG. 2) of the display 260 overlap each other. In addition, the first image 680 may be an image in which light beams for the subject overlap each other. Accordingly, the first image 680 may be different from the actual image 610 of the subject.

According to various embodiments, the electronic device 201 may generate (or acquire) a second image 690 from the first image 680 using a transfer function 685. The second image 690 may be the same as or similar to the actual image 610 of the subject. For example, the electronic device 201 may restore the actual image 610 of the subject using the first image 680 and the transfer function 685. The transfer function 685 may be stored in memory (the memory 230 in FIG. 2) in advance.

According to various embodiments, the electronic device 201 may identify depth information of the actual image 610. For example, the electronic device 201 may identify the depth information of the actual image 610 (e.g., information on valleys and peaks of a fingerprint) using a transfer function, which makes it possible to identify depth information. In addition, the electronic device 201 may output light beams through only some color pixels of the display 260, and may identify the depth information of the actual image 610 (e.g., information on valleys and peaks of a fingerprint) using the light beams reflected by the subject. This will be described in greater detail below with reference to FIG. 6B.

Figure 6B:
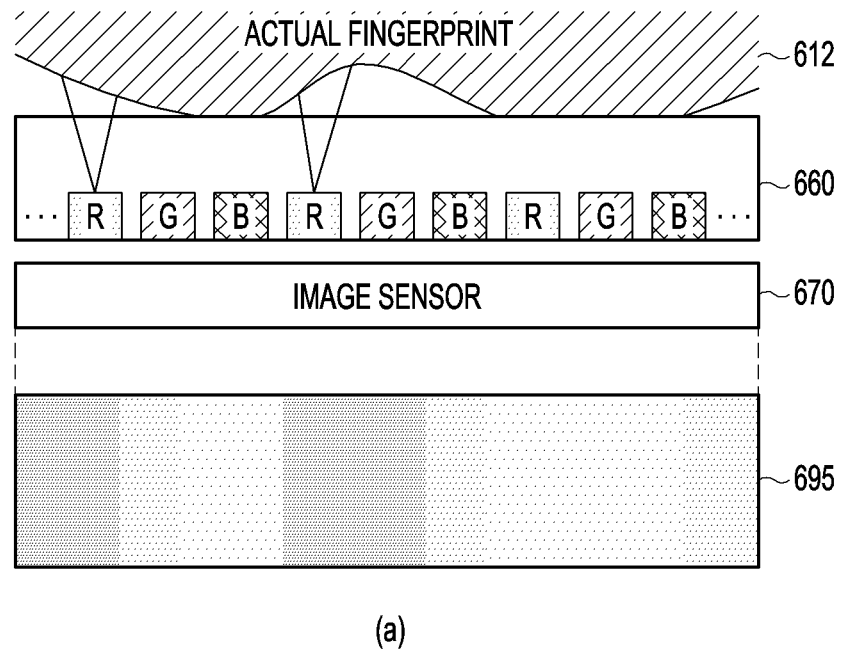
FIG. 6B is diagram illustrating an example method of restoring an image by an electronic device according to various embodiments.
Figure 6B:
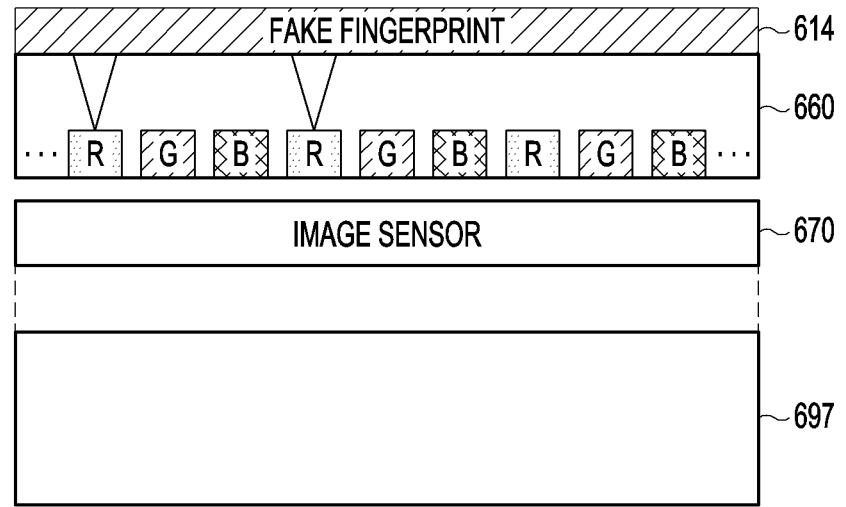

FIG. 6B is diagram illustrating an example method of restoring an image by an electronic device according to various embodiments.

Referring to FIG. 6B, the electronic device 201 may output light beams through pixels corresponding to a specific color among a plurality of pixels included in the display 660 (e.g., the display 260 in FIG. 2). When the light beams output through the pixels corresponding to a specific color (e.g., red) are reflected by the subject 612 or 614 and are incident on the image sensor 670 (e.g., the image sensor 270 in FIG. 2), the electronic device 201 may acquire an image 695 or 697 corresponding to the incident light beams. The electronic device 201 may identify the depth information of the subject (e.g., information on valleys and peaks of the fingerprint), based on the brightness difference in the image 695.

According to various embodiments, referring to FIG. 6B (a), the electronic device 201 may acquire an image 695 from an actual fingerprint 612. The electronic device 201 may acquire an image 695 by outputting light beams to the subject (or the actual fingerprint 612) through one or more pixels corresponding to a specific color (e.g., red). For example, since the actual fingerprint 612 includes valleys and peaks, the image 695 may include portions, which are different from each other in brightness. For example, the electronic device 201 may determine a portion corresponding to a bright portion of the image 695 as a peak of the fingerprint and a portion corresponding to a dark portion of the image 695 as a valley of the fingerprint. For example, the electronic device 201 may identify information on the valleys and peaks of the actual fingerprint 612, based on the difference in brightness between specific portions of the image 695.

Referring to FIG. 6B (b), the electronic device 201 may acquire an image 697 from a fake fingerprint 614. The electronic device 201 may acquire an image 697 by outputting light beams to the subject (or the fake fingerprint 614) through one or more pixels corresponding to a specific color (e.g., red). For example, since the fake fingerprint 614 does not include valleys and peaks unlike the actual fingerprint 612, the image 697 may not include portions, which are different from each other in brightness. For example, the electronic device 201 may determine whether a subject is an object having depth. For example, the electronic device 201 may determine that the subject is a fake fingerprint 614, based on the fact that the image 697 does not include portions that are different from each other in brightness.

According to various embodiments, the electronic device 201 may identify depth information of the subject before acquiring a transfer function using the method described above with reference to FIG. 6B. In addition, the electronic device 201 may identify whether the user fingerprint is an actual fingerprint or a fake fingerprint before acquiring the transfer function.

Figure 7:
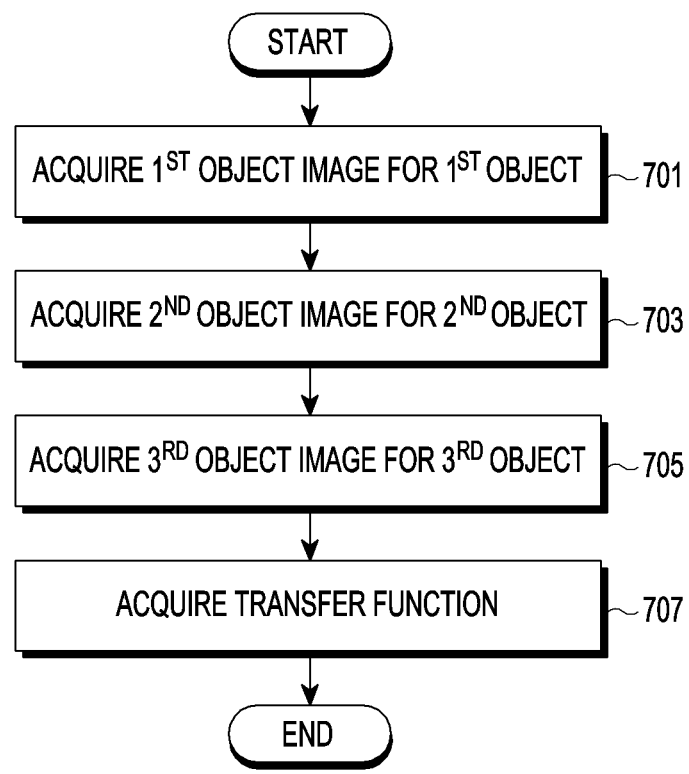
FIG. 7 is a flowchart illustrating an example method of acquiring a transfer function by an electronic device according to various embodiments.

FIG. 7 is a flowchart illustrating an example method of acquiring a transfer function by an electronic device according to various embodiments.

Figure 8A:
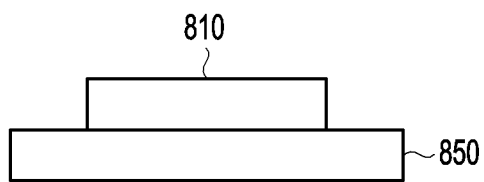
FIG. 8A is a diagram illustrating an example method of acquiring a transfer function by an electronic device according to various embodiments.
Figure 8B:
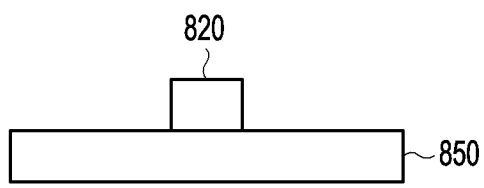
FIG. 8B is a diagram illustrating an example method of acquiring a transfer function by an electronic device according to various embodiments.
Figure 8C:
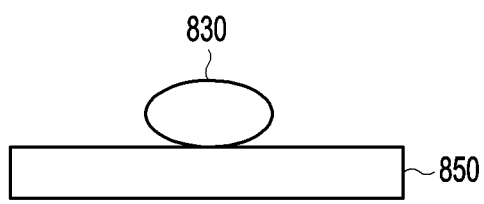
FIG. 8C is a diagram illustrating an example method of acquiring a transfer function by an electronic device according to various embodiments.

FIG. 8A is a diagram illustrating an example method of acquiring a transfer function by an electronic device according to various embodiments, FIG. 8B is a diagram illustrating an example method of acquiring a transfer function by an electronic device according to various embodiments, and FIG. 8C is a diagram illustrating an example method of acquiring a transfer function by an electronic device according to various embodiments.

According to various embodiments, the data obtained by the image sensor (the image sensor 270 in FIG. 2) of the electronic device 201 may have different values depending on information about an object (e.g., characteristics in shape, brightness, size, shape, and color). On the other hand, since a void pattern formed by a plurality of openings of the display 260 is fixed, when the type of the object varies, the data acquired by the image sensor 270 may also vary depending on the type of the object. For example, as in Equation 1 below, when a value corresponding to an object is x and a transfer function is A, a data value acquired by an image sensor may be b.

$$b = A * x \qquad \text{Equation 2}$$

According to various embodiments, depending on a plurality of values corresponding to a plurality of objects (x1 to xN in which N is a natural number of 2 or more), the electronic device 201 may acquire a plurality of data (b1 to bN in which N is a natural number of 2 or more). Accordingly, the electronic device 201 may acquire a transfer function based on a void pattern formed by a plurality of openings of a fixed display 260 using data values (or sensor values) of different image sensors 270, which correspond to different objects, respectively. The electronic device 201 may store the transfer function in memory (the memory 230 in FIG. 2).

According to various embodiments, the plurality of objects may have various shapes. For example, the various shapes may include patterns that may be represented by binary codes. For example, the plurality of objects may include objects having shapes illustrated by way of example in FIG. 14 below.

Hereinafter, an example embodiment of a method of acquiring a transfer function by electronic device 201 will be described with reference to FIGS. 7, 8A, 8B, and 8C. For example, the electronic device 201 may acquire a transfer function in a calibration step. For example, the calibrating step may include a step of resetting the electronic device 201 before product shipment or after product resetting. The electronic device 201 may acquire a transfer function in a user fingerprint registration step. The electronic device 201 may acquire a (new) transfer function according to the user's request.

In operation 701, when a specific first object 810 is positioned on a display 850 (e.g., the display 260 in FIG. 2), the electronic device 201 may acquire a first object image for the first object 810. For example, a specific value x1 corresponding to the first object 810 may be determined in advance. The electronic device 201 may determine a value b1 corresponding to the first object image using the first object image. The first object image may be an image different from the image of the actual first object 810.

In operation 703, after acquiring the first object image, the electronic device 201 may acquire a second object image for a second object 820 different from the first object. For example, when the first object 810 placed on the display 850 is replaced with the second object 820 after acquiring the first object image, the electronic device 201 may acquire a second object image for the second object 820. A specific value x2 corresponding to the second object 820 may be determined in advance. The second object 820 may be different from the first object 810 in shape, size, color, pattern, and/or brightness. In addition, the specific value x2 for the second object 820 may be different from the specific value x1 for the first object 810. The electronic device 201 may determine a value b2 corresponding to the second object image using the second object image. Meanwhile, the second object image may be an image different from the image of the actual second object 820.

In operation 705, after acquiring the second object image, the electronic device 201 may acquire a third object image for a third object 830 different from the first object 810 and the second object 820. For example, when the second object 820 placed on the display 260 is replaced with the third object 830 after acquiring the second object image, the electronic device 201 may acquire a third object image for the third object 830. A specific value x3 corresponding to the third object 830 may be determined in advance. For example, the third object 830 may be different from the first object 810 and the second object 820 in shape, size, color, pattern, and/or brightness. In addition, the specific value x3 for the third object 830 may be different from the specific value x1 for the first object 810 and the specific valve x2 for the second object 820. The electronic device 201 may determine a value b3 corresponding to the third object image using the third object image. Meanwhile, the third object image may be an image different from the image of the actual third object 830.

In operation 707, the electronic device 201 may acquire a transfer function using the values acquired in operations 701 to 705. For example, the electronic device 201 may acquire values b1, b2, and b3 corresponding to the first object image, the second object image, and the third object image according to the values x1, x2, and x3 corresponding to the first object 810, the second object 820, and the third object 830. The electronic device 201 may determine (or acquire) a transfer function corresponding to the void pattern of the display 850 using the relationship between x1 and b1, the relationship between x2 and b2, and the relationship between x3 and b3. For example, the electronic device 201 may acquire a transfer function through, for example, "singular value decomposition" calculation of values b1, b2, and b3 corresponding to the first object image, the second object image, and the third object image. The electronic device 201 may acquire a transfer function for relationships (or relevancies) between x1 and b1, between x2 and b2, and between x3 and b3 using a deep learning technology.

Figure 9:
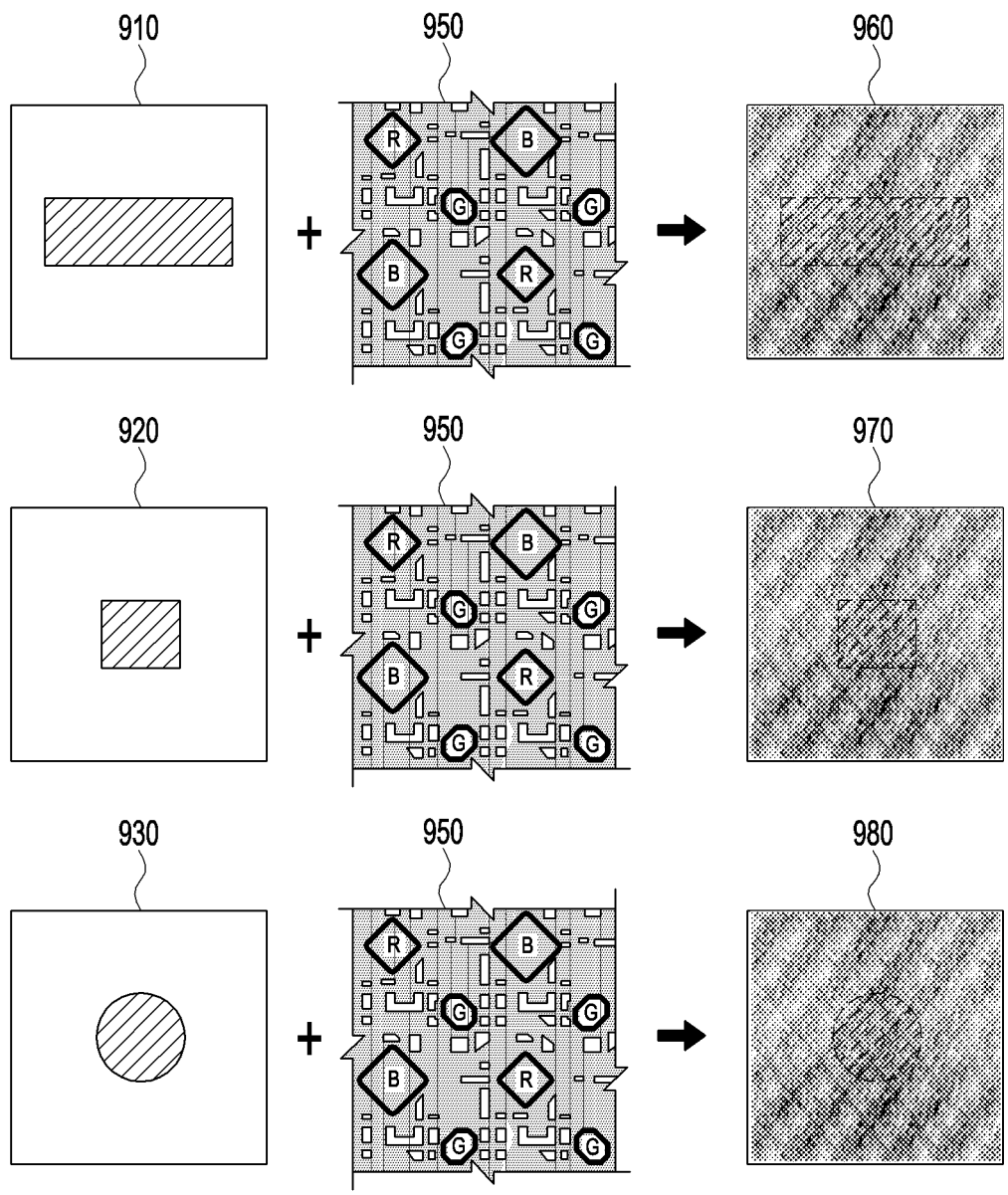
FIG. 9 is a diagram illustrating an example method of acquiring a transfer function by an electronic device according to various embodiments.

FIG. 9 is a diagram illustrating an example method of acquiring a transfer function by an electronic device according to various embodiments.

Referring to FIG. 9, an electronic device (e.g., the electronic device 201 in FIG. 2) may acquire a first object image 960 for a first object (e.g., the first object 810 in FIG. 8A). The first object image 960 may be an image in which light beams for the first object 810 overlap each other. In addition, the first object image 960 may be an image in which an image 950 for a void pattern of a circuit unit (the circuit unit 262 in FIG. 2) of the display 260 is also overlapped. Accordingly, the first object image 960 may be different from the actual image 910 of the first object 810.

According to various embodiments, the electronic device (e.g., the electronic device 201 in FIG. 2) may acquire a second object image 970 for a second object (e.g., the second object 820 in FIG. 8B). The second object image 970 may be an image in which light beams for the second subject 820 overlap each other. In addition, the second object image 970 may be an image in which an image 950 for the void pattern of the circuit unit 262 of the display 260 is also overlapped. Accordingly, the second object image 970 may be different from the actual image 920 of the second object 820.

According to various embodiments, the electronic device (e.g., the electronic device 201 in FIG. 2) may acquire a third object image 980 for a third object (e.g., the third object 830 in FIG. 8B). The third object image 980 may be an image in which light beams for the third object 830 overlap each other. In addition, the third object image 980 may be an image in which an image 950 for the void pattern of the circuit unit 262 of the display 260 is also overlapped. Accordingly, the third object image 980 may be different from the actual image 930 of the second object 830.

According to various embodiments, the electronic device 201 may determine (or acquire) a transfer function corresponding to the void pattern of the display 260 using the relationships between the first to third objects 810, 820, and 830 and the first to third object images 960, 970, and 980. The electronic device 201 may store the transfer function in memory (the memory 230 in FIG. 2).

According to various embodiments, when the user's finger touches the display 260, the electronic device 201 may identify the information on the fingerprint using the transfer function.

Three different objects are illustrated in FIGS. 7, 8A, 8B, 8C, and 9 for convenience of description, but the number and shapes of objects for the electronic device 201 to acquire a transfer function may not be limited thereto.

Figure 10:
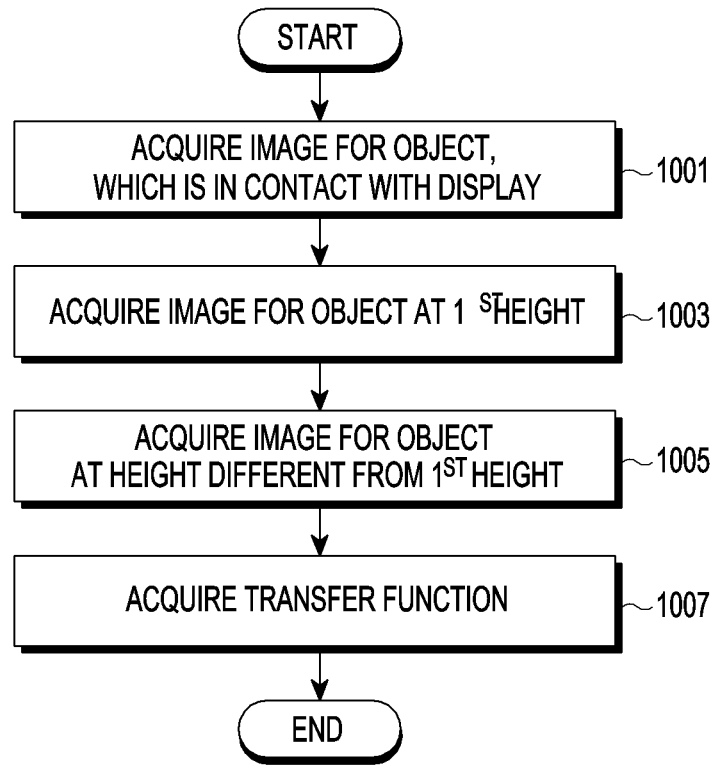
FIG. 10 is a flowchart illustrating an example method of acquiring a transfer function by an electronic device according to various embodiments.

FIG. 10 is a flowchart illustrating an example method of acquiring a transfer function by an electronic device according to various embodiments.

Figure 11A:
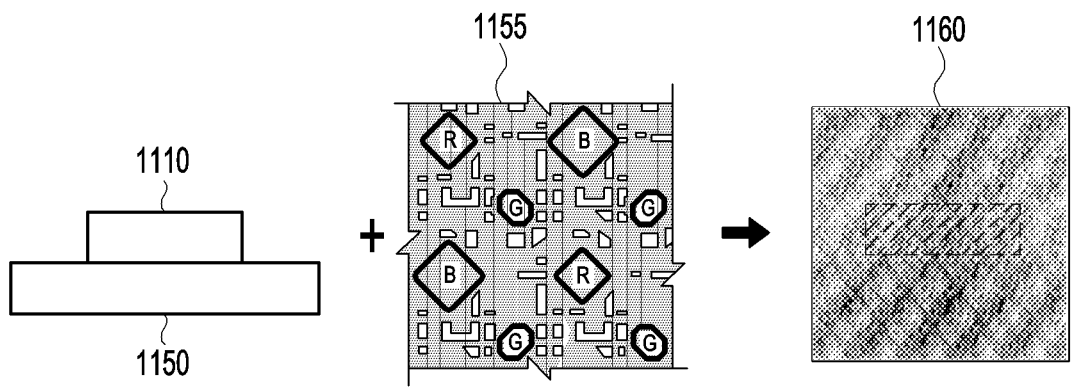
FIG. 11A is a diagram illustrating an example method of acquiring a transfer function by an electronic device according to various embodiments.
Figure 11B:
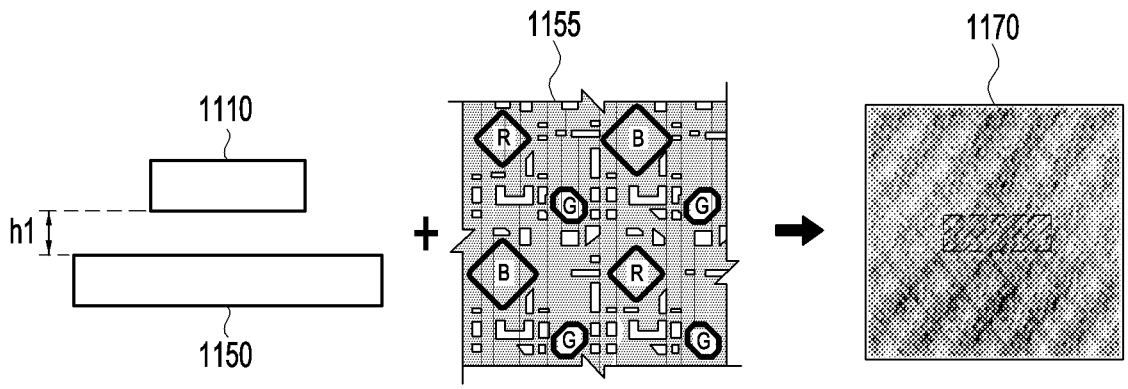
FIG. 11B is a diagram illustrating an example method of acquiring a transfer function by an electronic device according to various embodiments.
Figure 11C:
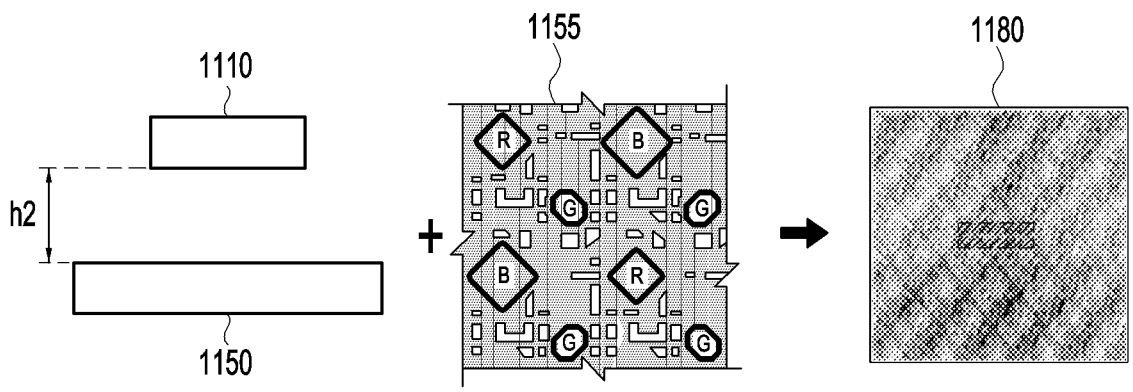
FIG. 11C is a diagram illustrating an example method of acquiring a transfer function by an electronic device according to various embodiments.

FIG. 11A is a diagram illustrating an example method of acquiring a transfer function by an electronic device according to various embodiments, FIG. 11B is a diagram illustrating an example method of acquiring a transfer function by an electronic device according to various embodiments, and FIG. 11C is a diagram illustrating an example method of acquiring a transfer function by an electronic device according to various embodiments.

Data acquired by an image sensor (the image sensor 270 of FIG. 2) of the electronic device 201 may have different values depending on the height between the display (the display 260 in FIG. 2) and an object. The electronic device 201 may acquire images while changing the height between the display 260 and the object and may acquire a transfer function according to the distance using the acquired images. The electronic device 201 may determine (or identify) the depth information of the object using the transfer function according to the distance.

Hereinafter, an example embodiment illustrating an example method of acquiring a transfer function by electronic device 201 will be described with reference to FIGS. 10, 11A, 11B, and 11C.

In operation 1001, in the state in which a first object (1110 in FIGS. 11A, 11B and 11C) is in contact with a display 1150 (e.g., the display 260 in FIG. 2), the electronic device 201 may acquire an image 1160 for the first object 1110. The image 1160 may be an image in which an image in the state in which the light beams for the first object 1110 overlap each other and an image 1155 for a void pattern of the display 1150 overlap each other. Accordingly, the image 1160 may be different from the image of the actual first object 1110.

In operation 1003, after acquiring the image 1160, the electronic device 201 may acquire an image 1170 for the first object at a first height h1. As described above, the image 1170 may be different from the image of the actual first object 1110.

In operation 1005, after acquiring the image 1170, the electronic device 201 may acquire an image 1180 for the first object at a second height h2 different from the first height h1. As described above, the image 1180 may be different from the image of the actual first object 1110.

In operation 1007, the electronic device 201 may acquire a transfer function using the images 1160, 1170, and 1180 acquired in operations 1001, 1003 and 1005. For example, the electronic device 201 may determine (acquire) a transfer function capable of identifying the depth information of a subject using relationships between an image 1160 acquired when the object 1110 is in contact with the display 1150, an image 1170 acquired when the object 1110 is located at the first height h1 from the display 1150, and an image 1180 acquired when the object 1110 is located at the second height h2 from the display 1150. For example, the electronic device 201 may acquire a transfer function, based on a difference between the images 1160, 1170, and 1180 according to a height difference.

According to various embodiments, the electronic device 201 may acquire a transfer function while changing heights for different objects. For example, the electronic device 201 may acquire a transfer function, based on the height change of each of different objects from the display 260. For example, when acquiring a transfer function according to the method described with reference to FIGS. 7, 8A, 8B, 8C and 9, the electronic device 201 may acquire the transfer function while changing the height of each of the objects. Through this, the electronic device 201 may acquire a transfer function in which the depth information is reflected (e.g., a transfer function that enables depth information to be identified). The electronic device 201 may store the acquired transfer function in memory (the memory 230 in FIG. 2).

According to various embodiments, when the user's finger touches the display 260, the electronic device 201 may identify the depth information of the valleys and peaks of the fingerprint using the transfer function, which enables the depth information to be identified. Through this, when identifying the user fingerprint, the electronic device 201 may determine whether the fingerprint is forged.

Hereinafter, an example embodiment of a method of acquiring a transfer function by electronic device 201 will be described. For example, the electronic device 201 may acquire a transfer function in a calibration step. For example, the calibrating step may include a step of resetting the electronic device 201 before product shipment or after product resetting. The electronic device 201 may acquire a transfer function in a user fingerprint registration step. The electronic device 201 may acquire a (new) transfer function according to the user's request.

Figure 12A:
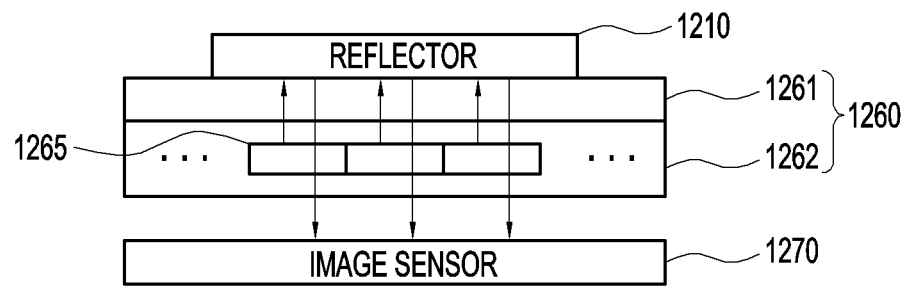
FIG. 12A is a diagram illustrating an example method of acquiring a transfer function by an electronic device according to various embodiments.
Figure 12B:
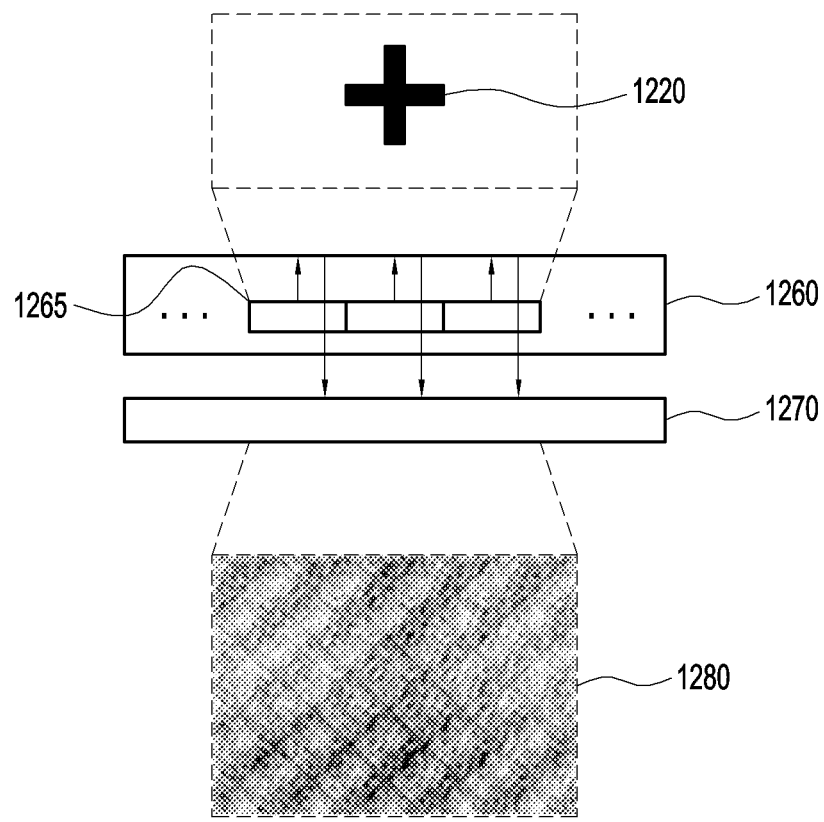
FIG. 12B is a diagram illustrating an example method of acquiring a transfer function by an electronic device according to various embodiments.

FIG. 12A is a diagram illustrating an example method of acquiring a transfer function by an electronic device according to various embodiments and FIG. 12B is a diagram illustrating an example method of acquiring a transfer function by an electronic device according to various embodiments.

Referring to FIGS. 12A and 12B, a display 1260 and an image sensor 1270 in FIG. 12 may correspond to parts of the display 260 and the image sensor 270 in FIG. 2. For example, the display 1260 and the image sensor 1270 in FIG. 12 may be implemented to be substantially the same as the display 260 and the image sensor 270 in FIG. 2. In addition, the display 1260 and the image sensor 1270 in FIG. 12 may be implemented to be substantially the same as the display 460 and the image sensor 470 in FIG. 4. A processor (the processor 220 in FIG. 2) may control operations of the display 1260 and the image sensor 1270.

Referring to FIG. 12A, according to various embodiments, the display 1260 may be in direct contact with the image sensor 1270 or may be spaced apart from the image sensor 1270 by a predetermined distance. The display 1260 may be stacked on top of the image sensor 1270. The display 1260 may include a transparent glass plate 1261 and a circuit unit 1262. For example, the transparent glass plate 1261 may be stacked on top of the circuit unit 1262.

According to various embodiments, the circuit unit 1262 may include a plurality of optical elements (or a plurality of pixels) 1265. For example, the plurality of optical elements (or the plurality of pixels) 1265 may be implemented by organic light-emitting diodes. In addition, the plurality of optical elements (or the plurality of pixels) may include elements (or pixels) capable of outputting various colors (e.g., white, red, blue, and green). For example, the circuit unit 1262 may output light beams using the plurality of optical elements 1265 under the control of the processor 220. For example, the circuit unit 1262 may output various types of light beams having a specific pattern using the plurality of optical elements 1265. For example, the specific pattern may be a pattern that may be represented by binary codes. For example, referring to FIG. 12B, the display 1260 may display (or output) an object 1220 having a specific shape under the control of the processor 220. For example, the plurality of light beams may include at least one color among white, red, blue, and green.

According to various embodiments, when a reflector 1210 is placed on the glass plate 1261, the light beams output from the circuit unit 1262 may be reflected by the reflector 1210 and may be input to the circuit part 1262 again. For example, the reflector 1210 may refer to an object capable of reflecting light. For example, the reflector 1210 may include, for example, and without limitation, reflective tape, glass, cellophane tape, or the like. The reflector 1210 may be disposed on the glass plate 1261 to be in contact with the glass plate 1261 or to be spaced apart from the glass plate 1261 by a predetermined distance.

According to various embodiments, the light beams reflected by the reflector 1210 may be filtered by the circuit unit 1262 and may be input to the image sensor 1270. The processor 220 may acquire an image corresponding to the received light beams through the image sensor 1270. In this case, the image may be an image in which the light beams reflected by the reflector 1210 overlap each other while being filtered by the circuit unit 1262. Accordingly, the image may have a cloudy shape and may be different from the actual image of the subject. For example, referring to FIG. 12B, the processor 220 may acquire an image 1280 corresponding to the object 1220 having a specific shape through the image sensor 1270. In other words, the image 1280 may be different from the actual image of the object 1220 because the image 1280 is filtered by the openings included in the circuit unit 1262.

According to various embodiments, the processor 220 may acquire images corresponding to various types of light beams output through the circuit unit 1262 a plurality of times. In addition, the processor 220 may obtain a transfer function, based on the relationship between the images acquired a plurality of times and values corresponding to various types of light beams. For example, the methods described above with reference to FIGS. 7, 8A, 8B, 8C, 9, 10, 11A, 11B and 11C may be used as methods of acquiring a transfer function.

FIGS. 12A and 12B illustrate an embodiment in which a reflector is placed on the glass plate 1261 instead of a specific object, compared with the embodiment of FIGS. 8A, 8B and 8C. With the electronic device (e.g., the electronic device 201) of FIGS. 12A and 12B, it is possible to derive an effect, which is the same as or similar to that obtained by placing the specific object on the glass plate 1261, using the specific types of light beams outputted by the circuit unit 1262 and the reflector 1210. The actual light emission does not occur at the surface of the display, that is, the surface of the upper glass 1261, but may be performed by a plurality of light-emitting elements located at the bottom side lower by the thickness of the glass plate 1261 than the surface of the upper glass 1261. For example, the location at which the actual light emission is performed is not the surface of the glass plate 1261, but may be located at the bottom side lower by a distance corresponding to the thickness of the glass plate 1261 from the surface of the upper glass 1261. Accordingly, the embodiment of FIGS. 12A and 12B is capable of acquiring a transfer function, based on the location at which actual light emission is performed, and thus, it is possible to obtain a transfer function more accurately compared with the embodiment of FIGS. 8A, 8B and 8C.

Figure 13:
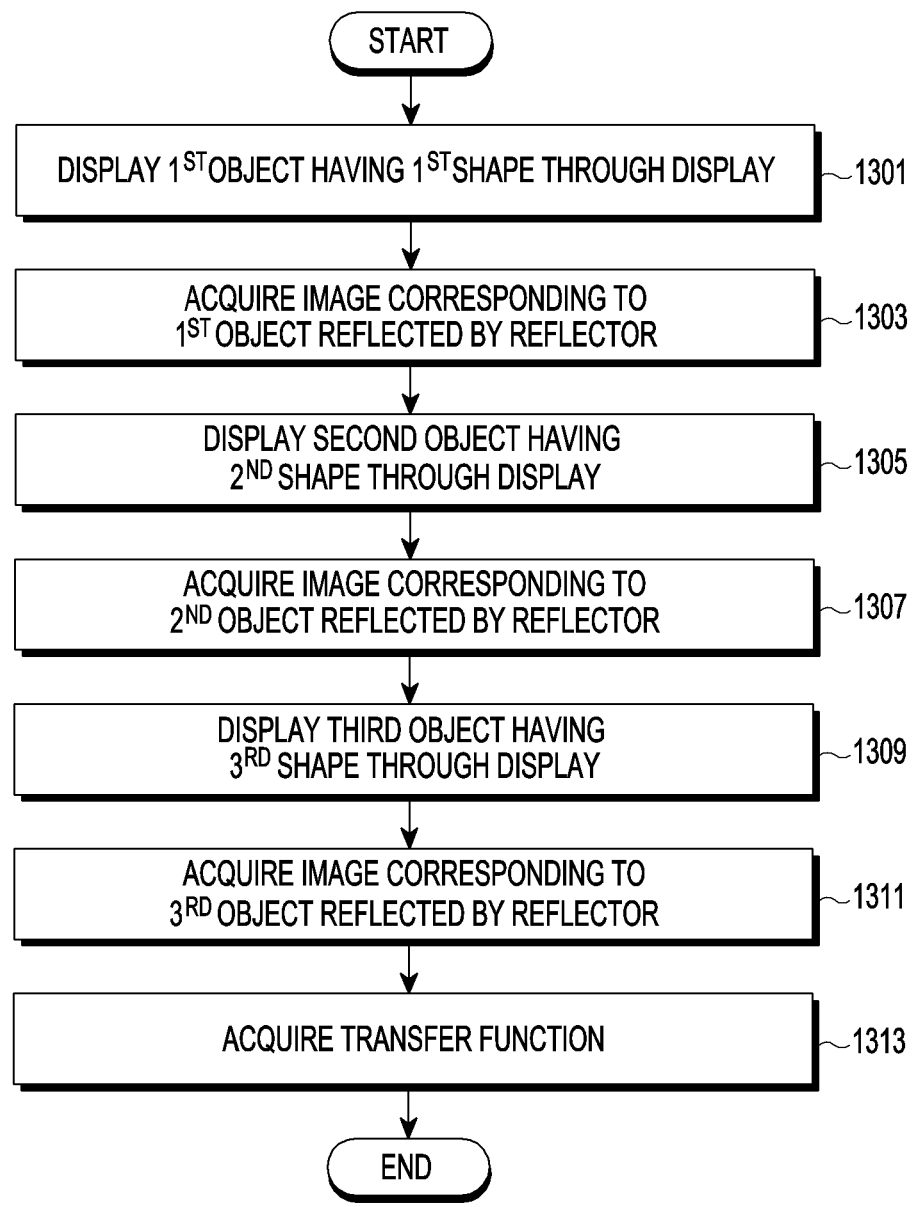
FIG. 13 is a flowchart illustrating an example method of acquiring a transfer function by an electronic device according to various embodiments.

FIG. 13 is a flowchart illustrating an example method of acquiring a transfer function by an electronic device according to various embodiments.

Figure 14:
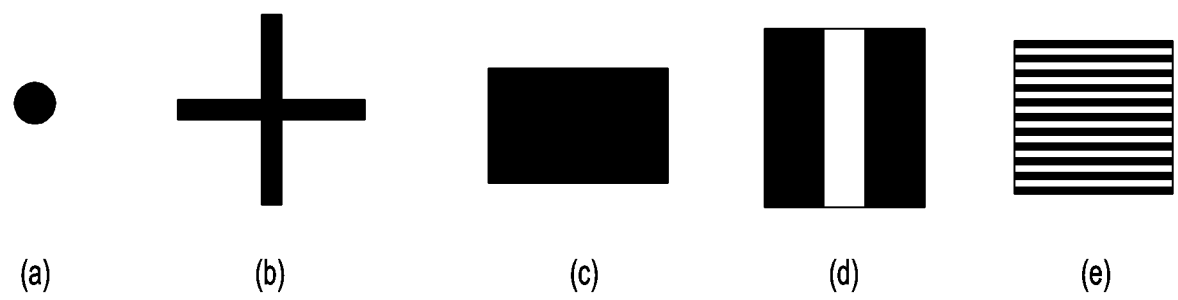
FIG. 14 is diagram illustrating example objects of various types displayed by a display of an electronic device according to various embodiments.

FIG. 14 is diagram illustrating example objects of various types displayed by a display of an electronic device according to various embodiments.

Referring to FIG. 13, the electronic device 201 (or the processor 220) may display an object having a specific shape through a display (e.g., the display 1260 in FIG. 12) to acquire a transfer function. The electronic device 201 may output light beams corresponding to an object having a specific shape to the reflector (e.g., the reflector 1210 in FIG. 12) located outside the display 1260 using the display 1260. For example, the specific shape may be a shape having a pattern that may be represented by binary codes. In addition, the object having a specific shape may be any one of the objects illustrated in FIG. 14.

In operation 1301, the electronic device 201 may display a first object having a first shape through the display 1260.

For example, the first shape may be a "dot" shape, and the first object may be the object illustrated in FIG. 14 (a). When the first object is displayed on the display 1260, the light beams corresponding to the first object may be reflected by the reflector 1210 placed on the display 1260.

In operation 1303, the electronic device 201 may acquire an image corresponding to the first object reflected by the reflector 1210. For example, the image corresponding to the first object may correspond to the light beams reaching the image sensor 1270 through the circuit unit 1262 of the display 1260 among the light beams corresponding to the first object reflected by the reflector 1210. The image corresponding to the first object may be different from the actual image of the first object displayed on the display 1260.

In operation 1305, the electronic device 201 may display a second object having a second shape through the display. For example, the second shape may be a "cross" shape, and the second object may be the object illustrated in FIG. 14 (b). When the second object is displayed through the display 1260, the light beams corresponding to the second object may be reflected by the reflector 1210 placed on the display 1260.

In operation 1307, the electronic device 201 may acquire an image corresponding to the second object reflected by the reflector 1210. For example, the image corresponding to the second object may correspond to the light beams reaching the image sensor 1270 through the circuit unit 1262 of the display 1260 among the light beams corresponding to the second object reflected by the reflector 1210. The image corresponding to the second object may be different from the actual image of the second object displayed on the display 1260.

In operation 1309, the electronic device 201 may display a third object having a third shape through the display 1260. For example, the third shape may be a "rectangular" shape, and the third object may be the object illustrated in FIG. 14 (c), (d) or (e) When the third object is displayed through the display 1260, the light beams corresponding to the third object may be reflected by the reflector 1210 placed on the display 1260.

In operation 1311, the electronic device 201 may acquire an image corresponding to the third object reflected by the reflector 1210. For example, the image corresponding to the third object may correspond to the light beams reaching the image sensor 1270 through the circuit unit 1262 of the display 1260 among the light beams corresponding to the third object reflected by the reflector 1210. The image corresponding to the third object may be different from the actual image of the third object displayed on the display 1260.

In operation 1313, the electronic device 201 may acquire a transfer function, based on a relationship between a value for the first object and a value for the image corresponding to the first object, and a relationship between a value for the second object and a value for the image corresponding to the second object, and a relationship between a value for the third object and a value for the image corresponding to the third object. For example, the electronic device 201 may acquire a transfer function using the method described in operation 707 of FIG. 7.

Although FIG. 13 illustrates an example operation of acquiring three images corresponding to three objects and acquiring a transfer function, based on respective relationships between three objects and three images, the technical idea of the disclosure is not limited thereto. For example, an embodiment may derive a transfer function by acquiring enough objects and images to obtain a transfer function. An embodiment may derive a transfer function, based on a relationship between one object and a corresponding image so as to acquire a transfer function.

Figure 15:
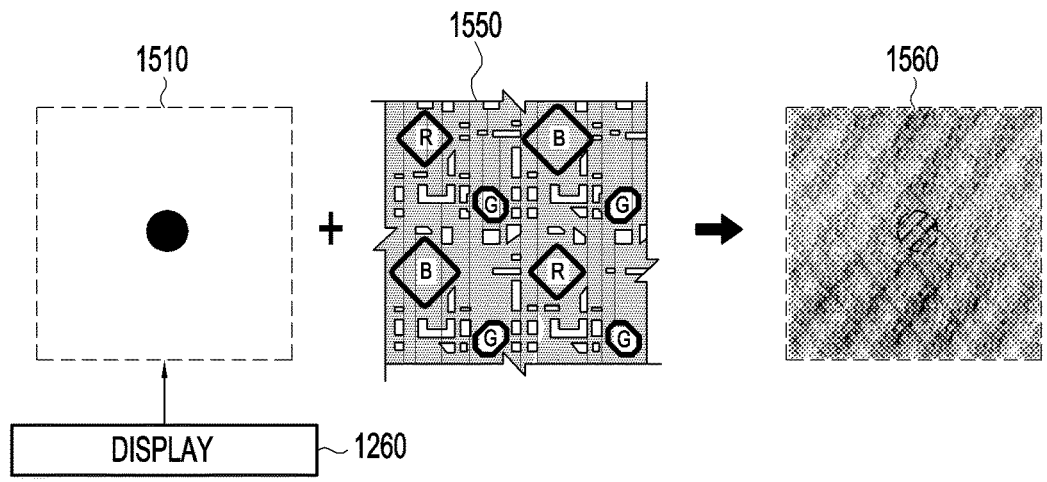
FIG. 15 is a diagram illustrating an example method of acquiring a transfer function by an electronic device according to various embodiments.
Figure 15:
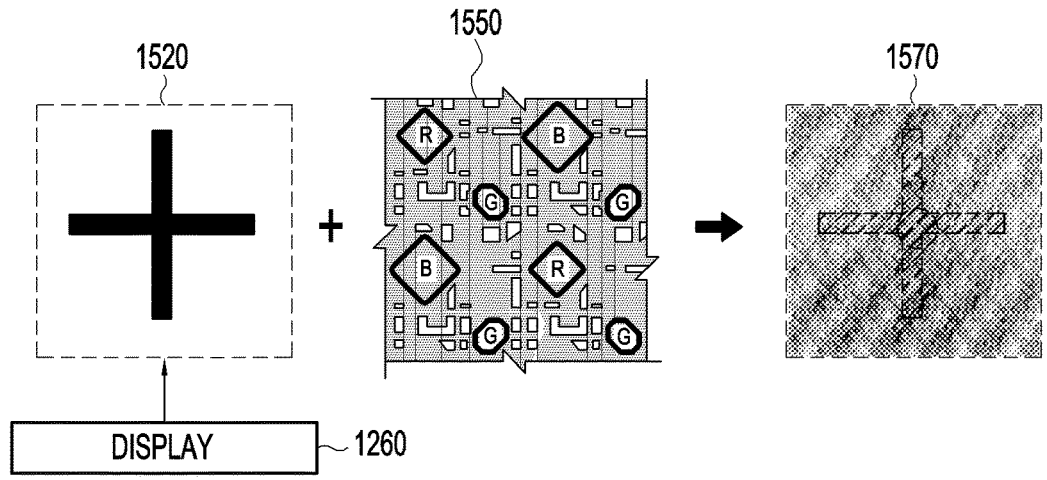
Figure 15:
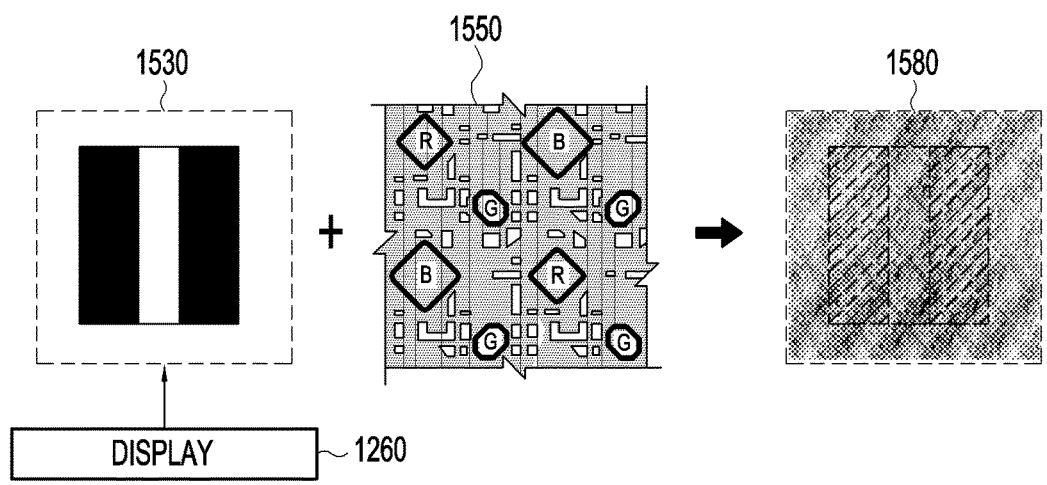

FIG. 15 is a diagram illustrating an example method of acquiring a transfer function by an electronic device according to various embodiments.

Referring to FIG. 15, when a first object 1510 is displayed on the display 1260, the electronic device (e.g., the electronic device 201 in FIG. 2) may acquire a first object image 1560 reflected by the reflector (e.g., the reflector 1210 in FIG. 12) and filtered by the display 1260. The first object image 1560 may be an image in which light beams for the first object 1510 overlap each other. In addition, the first object image 1560 may be an image in which an image 1550 for a void pattern of a circuit unit (the circuit unit 1162 in FIG. 12) of the display 1260 is also overlapped. Accordingly, the first object image 1560 may be different from the actual image of the first object 1510.

According to various embodiments, when a second object 1520 is displayed on the display 1260, the electronic device 201 may acquire a third object image 1570 reflected by the reflector 1210 and filtered by the display 1260. The second object image 1570 may be an image in which light beams for the second object 1520 overlap each other. In addition, the second object image 1570 may be an image in which an image 1550 for the void pattern of the circuit unit 1162 of the display 1260 is also overlapped. Accordingly, the second object image 1570 may be different from the actual image of the second object 1520.

According to various embodiments, when a third object 1530 is displayed on the display 1260, the electronic device 201 may acquire a third object image 1580 reflected by the reflector 1210 and filtered by the display 1260. The third object image 1580 may be an image in which light beams for the third object 1530 overlap each other. In addition, the third object image 1580 may be an image in which an image 1550 for the void pattern of the circuit unit 1162 of the display 1260 is also overlapped. Accordingly, the third object image 1580 may be different from the actual image of the third object 1530.

According to various embodiments, the electronic device 201 may determine (or acquire) a transfer function corresponding to the void pattern of the display 260 using the relationship between each the first to third objects 1510, 1520, and 1530 and each of the first to third object images 1560, 1570, and 1580. The electronic device 201 may store the transfer function in memory (the memory 230 in FIG. 2).

According to various embodiments, when the user's finger touches the display 260, the electronic device 201 may identify the information on the fingerprint using the transfer function.

FIGS. 12A, 12B, 13, and 15 illustrate an example method of acquiring a transfer function using three different objects for convenience of description, but the number and shapes of objects for the electronic device 201 to acquire a transfer function may not be limited thereto.

Figure 16:
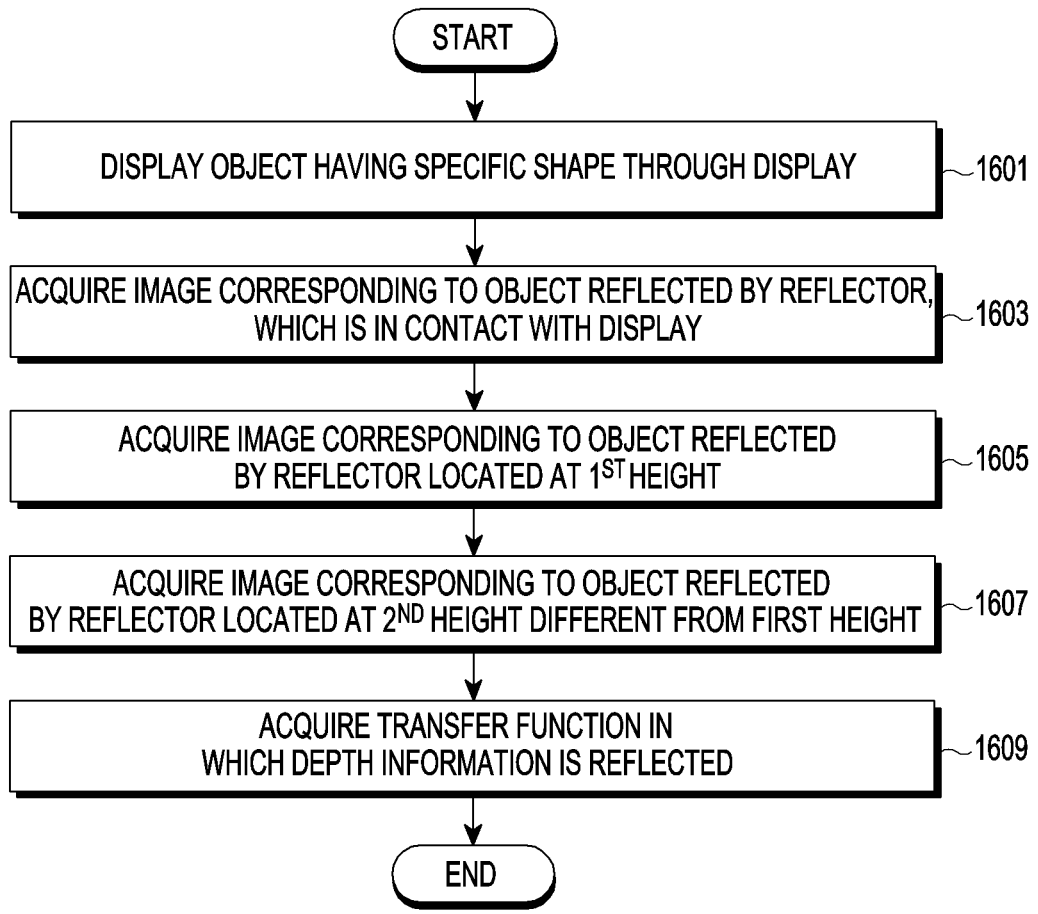
FIG. 16 is a flowchart illustrating an example method of acquiring a transfer function, in which depth information is reflected, by an electronic device according to various embodiments.

FIG. 16 is a flowchart illustrating an example method of acquiring a transfer function, in which depth information is reflected, by an electronic device according to various embodiments.

Referring to FIG. 16, the electronic device (e.g., the electronic device 201 in FIG. 2) may acquire a transfer function for measuring depth information.

According to various embodiments, data acquired by an image sensor (the image sensor 270 of FIG. 2) of the electronic device 201 may have different values depending on the height between the display (the display 1260 in FIG. 12) and a reflector (e.g., the reflector 1210 in FIG. 12) that reflects an object displayed through the display 260. The electronic device 201 may acquire images while changing the height between the display 1260 and the reflector 1210 and may acquire a transfer function according to the distance using the acquired images. The electronic device 201 may determine (or identify) the depth information of the object using the transfer function according to the distance.

In operation 1601, the electronic device 201 may display an object having a specific shape through the display 1260. For example, the object may be any one of the objects illustrated in FIG. 14. When the object is displayed through the display 1260, the light beams corresponding to the object may be reflected by the reflector 1210 placed on the display 1260.

In operation 1603, the electronic device 201 may acquire an image corresponding to the object reflected by the reflector 1210 which is in contact with the display 1260 (or the glass plate 1261). For example, the image corresponding to the object may correspond to the light beams reaching the image sensor 1270 through the circuit unit 1262 of the display 1260 among the light beams corresponding to the object reflected by the reflector 1210 in the state in which the reflector 1210 is in contact with the display 1260.

In operation 1605, the electronic device 201 may acquire an image corresponding to the object reflected by the reflector 1210, which is located at a first height with reference to the display 1260. For example, the electronic device 201 may acquire an image corresponding to the object in the state in which the reflector 1210 is in contact with the display 1260, and may then acquire an image for the object in the state in which the reflector 1210 is located at the first height. For example, the image acquired through the reflector 1210, which is located at the first height, may be different from the image acquired through the reflector 1210, which is in contact with the display 1260.

In operation 1607, the electronic device 201 may acquire an image corresponding to the object reflected by the reflector 1210, which is located at a second height different from the first height with reference to the display 1260. For example, the electronic device 201 may acquire an image corresponding to the object through the reflector 1210 which is located at the first height, and may then acquire an image for the object in the state in which the reflector 1210 is located at the second height. For example, the image acquired through the reflector 1210, which is located at the second height, may be different from the image acquired through the reflector 1210, which is in contact with the display 1260. In addition, the image acquired through the reflector 1210, which is located at the second height, may be different from the image acquired through the reflector 1210, which is located at the first height.

In operation 1609, the electronic device 201 may acquire a transfer function, in which depth information is reflected, using the values acquired in operations 1603 to 1607. For example, the electronic device 201 may determine (acquire) a transfer function capable of identifying the depth information of a subject using relationships between an image acquired when the reflector 1210 is in contact with the display 1260, an image acquired when the reflector 1210 is located at the first height from the display 1260, and an image acquired when the reflector 1210 is located at the second height from the display 1260. That is, the electronic device 201 may acquire a transfer function, based on a height difference between the images.

According to various embodiments, the electronic device 201 may acquire a transfer function by changing the height of the reflector while displaying different objects through the display. The electronic device 201 may acquire a transfer function using the images acquired while changing the height of the reflector 1210 for each of the different objects displayed through the display 1260. For example, when acquiring a transfer function according to the method described with reference to FIG. 13, the electronic device 201 may acquire the transfer function while changing the height of the reflector. Through this, the electronic device 201 may acquire a transfer function in which the depth information is reflected (e.g., a transfer function, which makes it possible to identify depth information). The electronic device 201 may store the acquired transfer function in memory (the memory 230 in FIG. 2).

According to various embodiments, when the user's finger touches the display 1260, the electronic device 201 may identify the depth information of the valleys and peaks of the fingerprint using the transfer function, which enables the depth information to be identified. Through this, when identifying a user fingerprint, the electronic device 201 may determine whether the fingerprint is forged.

An operation of acquiring a transfer function using images corresponding to three different heights is described with reference to FIG. 16 for convenience of description, but the number of heights for the electronic device 201 to obtain a transfer function may not be limited thereto.

Figure 17:
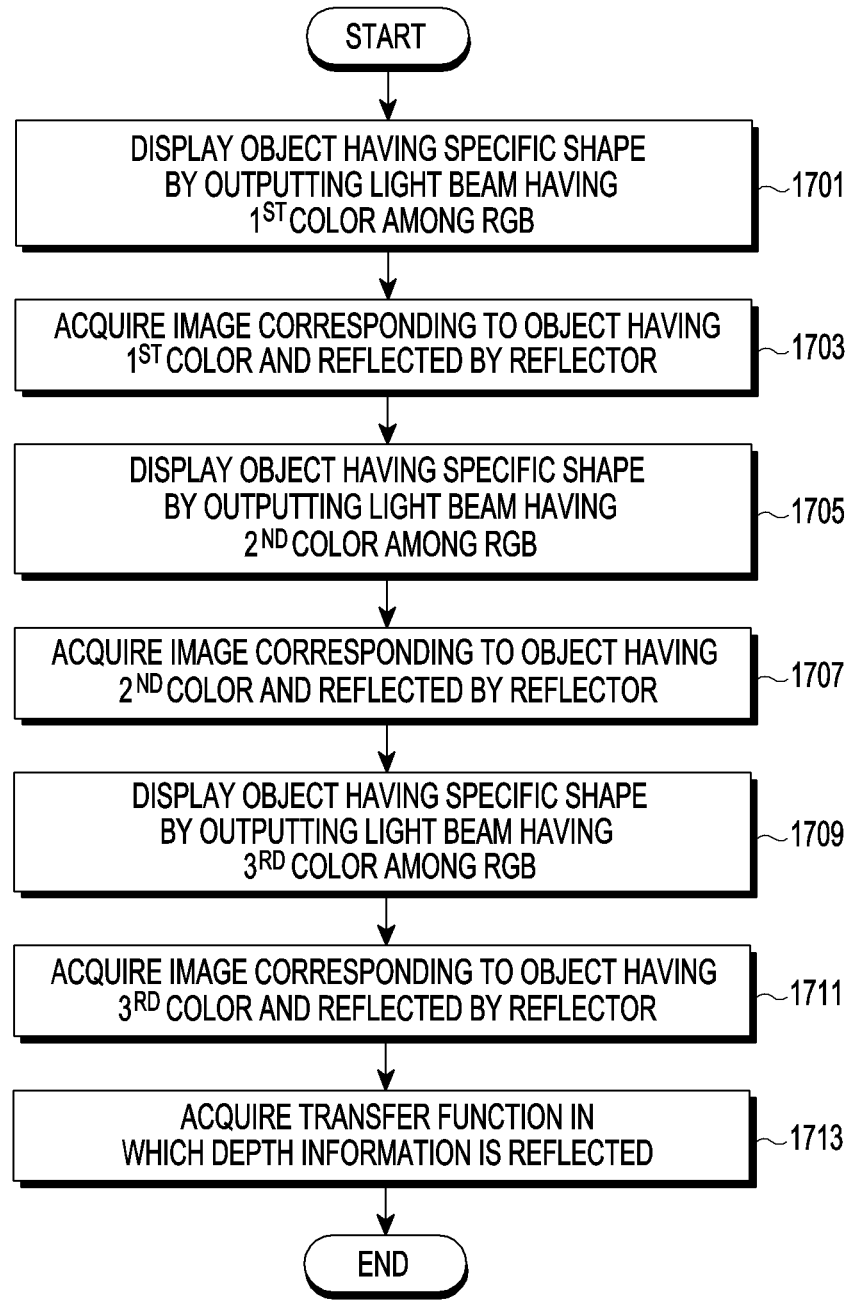
FIG. 17 is a flowchart illustrating an example method of acquiring a transfer function, in which depth information is reflected, by an electronic device according to various embodiments.

FIG. 17 is a flowchart illustrating an example method of acquiring a transfer function, in which depth information is reflected, by an electronic device according to various embodiments.

Referring to FIG. 17, the electronic device (e.g., the electronic device 201 in FIG. 2) may output light beams having at least one color among white, red, blue, and green using a plurality of optical elements 1265 included in a display (e.g., the display 1260 in FIG. 12). The plurality of optical elements 1265 may include optical elements, which correspond to red (R), blue (B), and green (G), respectively. For example, the plurality of optical elements 1265 may include a red organic light-emitting diode (OLED), a blue organic light-emitting diode (OLED), and a green organic light-emitting diode (OLED). The plurality of optical elements 1265 may be arranged, based on a color output by each of the elements.

In operation 1701, the electronic device 201 may display an object having a specific shape by outputting a light beam having a first color among RGB. For example, the electronic device 201 may display an object using the optical elements corresponding to the first color among the plurality of optical elements 1265 included in the display 1260. For example, the object having a specific shape may be implemented in a first color.

In operation 1703, when the object having the first color is displayed on the display 1260, the electronic device 201 may acquire an image corresponding to the object of the first color reflected by the reflector 1210 and filtered by the display 1260.

In operation 1705, the electronic device 201 may display an object having a specific shape by outputting a light beam having a second color among RGB. For example, the electronic device 201 may display an object using the optical elements corresponding to the second color among the plurality of optical elements 1265 included in the display 1260. For example, the object having a specific shape may be implemented in a second color.

In operation 1707, when the object having the second color is displayed on the display 1260, the electronic device 201 may acquire an image corresponding to the object of the second color reflected by the reflector 1210 and filtered by the display 1260.

In operation 1709, the electronic device 201 may display an object having a specific shape by outputting a light beam having a third color among RGB. For example, the electronic device 201 may display an object using the optical elements corresponding to the third color among the plurality of optical elements 1265 included in the display 1260. For example, the object having a specific shape may be implemented in a third color.

In operation 1711, when the object having the third color is displayed on the display 1260, the electronic device 201 may acquire an image corresponding to the object of the third color reflected by the reflector 1210 and filtered by the display 1260.

In operation 1713, the electronic device 201 may acquire a transfer function, in which depth information is reflected, using the values acquired in operations 1701 to 1711. For example, the electronic device 201 may determine (or acquire) a transfer function, which makes it possible to identify depth information of a subject, using an image corresponding to the object of the first color, an image corresponding to the object of the second color, and an image corresponding to the object of the third color. That is, since the locations of the optical elements outputting the first color, the locations of the optical elements outputting the second color, and the locations of the optical elements outputting the third color are different from each other, the electronic device 201 may acquire a transfer function, which makes it possible to identify depth information, based on a difference in positions between optical elements corresponding to different colors.

Figure 18A:
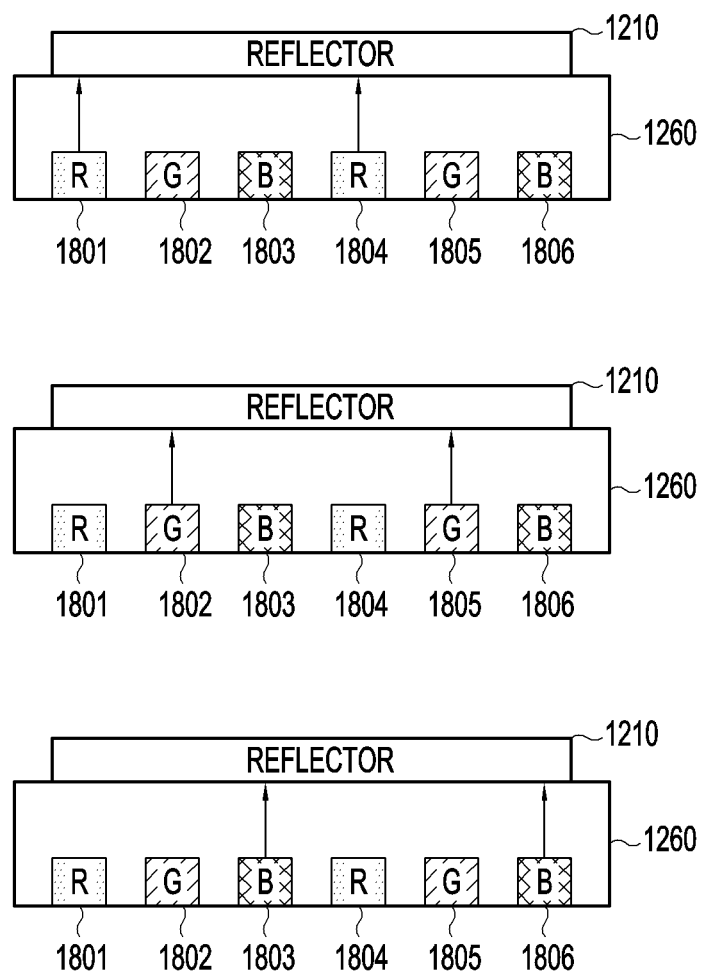
FIG. 18A is diagram illustrating an example method of acquiring a transfer function, in which depth information is reflected, by an electronic device according to various embodiments.
Figure 18B:
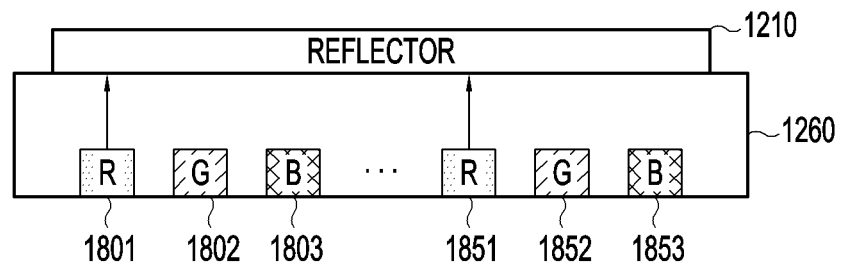
FIG. 18B is diagram illustrating an example method of acquiring a transfer function, in which depth information is reflected, by an electronic device according to various embodiments.
Figure 18B:
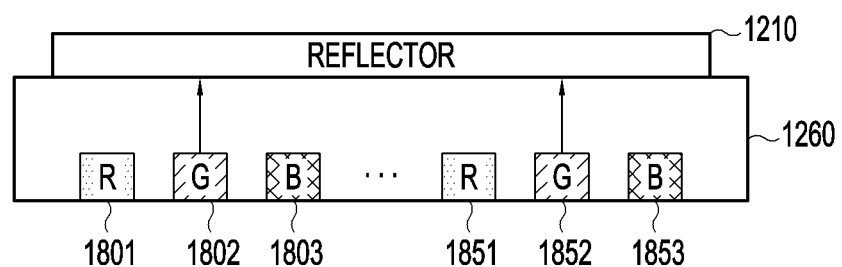
Figure 18B:
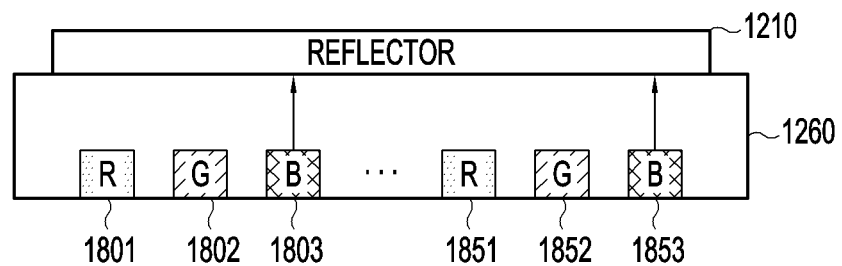
Figure 18C:
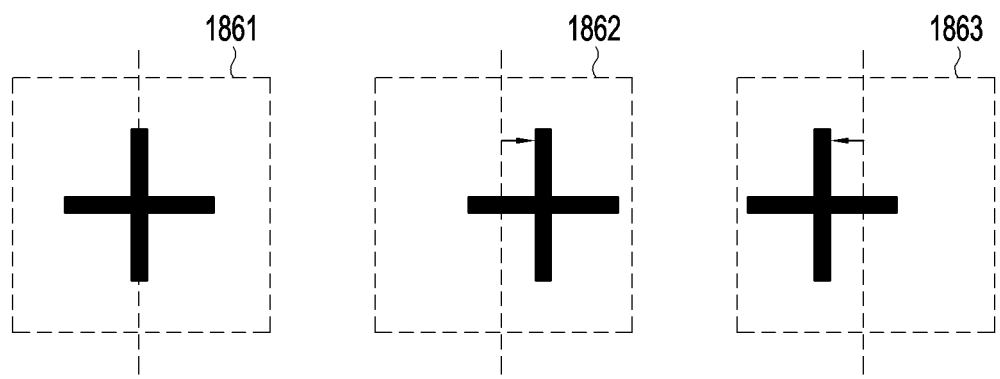
FIG. 18C is diagram illustrating an example method of acquiring a transfer function, in which depth information is reflected, by an electronic device according to various embodiments.
Figure 18D:
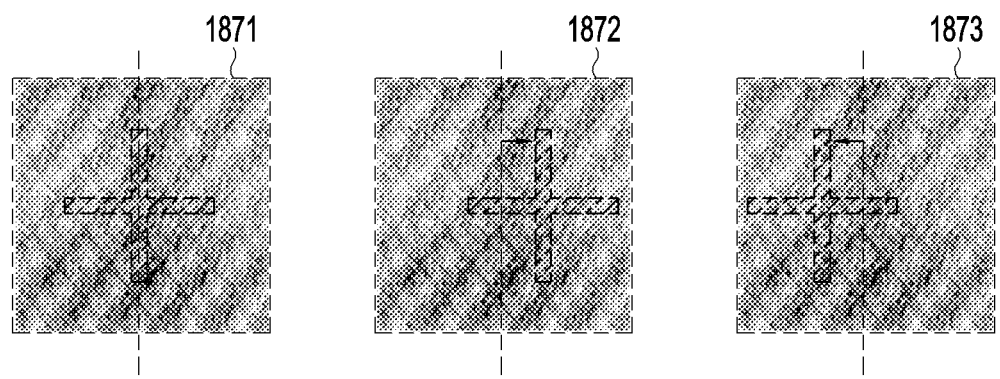
FIG. 18D is diagram illustrating an example method of acquiring a transfer function, in which depth information is reflected, by an electronic device according to various embodiments.

FIG. 18A is diagram illustrating an example method of acquiring a transfer function, in which depth information is reflected, by an electronic device according to various embodiments, FIG. 18B is diagram illustrating an example method of acquiring a transfer function, in which depth information is reflected, by an electronic device according to various embodiments, FIG. 18C is diagram illustrating an example method of acquiring a transfer function, in which depth information is reflected, by an electronic device according to various embodiments, and FIG. 18D is a diagram illustrating an example method of acquiring a transfer function, in which depth information is reflected, by an electronic device according to various embodiments.

Referring to FIGS. 18A, 18B and 18C, according to various embodiments, the electronic device (the electronic device 201 in FIG. 2) may display an object 1861 using only red elements (or red pixels) R. The electronic device 201 may display an object 1862 using only green elements (or green pixels) G. In addition, the electronic device 201 may display an object 1863 using only blue elements (or blue pixels) B.

Referring to FIG. 18A, the electronic device 201 may display the object 1861 by outputting light beams from all the red elements 1801 and 1804 among a plurality of optical elements (e.g., 1801, 1802, 1803, 1804, 1806, 1806, which may be referred to hereinafter as 1801 to 1806) (e.g., the plurality of optical elements 1265 in FIG. 12). Similarly, the electronic device 201 may display the object 1862 by outputting light beams from all the green elements 1802 and 1805 among the plurality of optical elements (e.g., the optical elements 1801 to 1806) and may display the object 1863 by outputting light beams from all the blue elements 1803 and 1806. For example, the electronic device 201 may first display the object 1861 using red light beams, and may sequentially display the object 1862 using green light beams and the object 1863 using blue light beams.

Referring to FIG. 18B, the electronic device 201 may display an object 1861, 1862, or 1863 using only the elements 1801 and 1851, the elements 1802 and 1852, or the elements 1803 and 1853 that are spaced apart from each other by a predetermined distance among the plurality of optical elements (e.g., the optical elements 1801, 1802, 1803, 1851, 1852 and 1853). The electronic device 201 may display an object 1861, 1862, or 1863 using only at least some of the plurality of optical elements 1265. The electronic device 201 may output light beams and may display an object 1861, 1862, or 1863 by asymmetrically and randomly selecting using only at least some of the plurality of optical elements 1265.

Referring to FIG. 18C, according to various embodiments, the object 1862 using only the green elements G may be displayed in the state of being shifted to the right with reference to the object 1861 displayed using only the red elements R. In addition, the object 1863 using only the blue elements B may be displayed in the state of being shifted to the left with reference to the object 1861 displayed using only the red elements R. Because the locations of the red elements R, the green elements G, and the blue elements B are different from each other, the display locations of the objects 1861, 1862, and 1863 may be different from each other.

Referring to FIG. 18D, the electronic device 201 may acquire an image (e.g., an image having a specific color) that is reflected by the reflector 1210 and filtered by the openings of the display 1260. For example, the electronic device 201 may acquire an image 1871 corresponding to the object 1861 using only the red elements R. The electronic device 201 may acquire an image 1872 corresponding to the object 1862 using only the green elements G. In addition, the electronic device 201 may acquire an image 1873 corresponding to the object 1863 using only the blue elements B.

According to various embodiments, the image 1872 corresponding to the object 1862 using only the green elements G may be shifted to the right with reference to the image 1871 corresponding to the object 1861 displayed using only the red elements R. In addition, the image corresponding to the object 1863 using only the blue elements B may be shifted to the left with reference to the image 1871 corresponding to the object 1861 displayed using only the red elements R.

According to various embodiments, the electronic device 201 may acquire a transfer function, which makes it possible to identify depth information, using differences between the images 1871, 1872, and 1873. For example, the electronic device 201 may acquire a transfer function, which makes it possible to identify depth information, using differences (e.g., differences in shifted distance) of the images 1871, 1872, and 1873 according to distances between elements that output different colors.

According to various embodiments, the electronic device 201 may acquire a transfer function using the image 1871, 1872, or 1873 acquired for each color. In addition, the electronic device 201 may identify depth information using the transfer function acquired for each color.

According to various embodiments, when the user's finger touches the display 1260, the electronic device 201 may acquire images for the fingerprint of the finger by sequentially outputting light beams of RGB colors. For example, the electronic device 201 may identify the depth information of valleys and peaks of the fingerprint from the acquired images using the transfer functions, which make it possible to identify depth information. Through this, when identifying a user fingerprint, the electronic device 201 may determine whether the fingerprint (e.g., a 2D or 3D fingerprint) is forged.

An operation of acquiring a transfer function using images corresponding to three different colors is described with reference to FIG. 17 and FIGS. 18A, 18B, 18C and 18D for convenience of description, but the number and types of colors for the electronic device 201 to obtain a transfer function may not be limited thereto.

An electronic device according to various example embodiments may include an image sensor including a plurality of photodiodes, a display including a plurality of patterned openings, and a processor. The processor may be configured to control the electronic device to: acquire, through the image sensor, a first image using a plurality of incident light beams for a subject which pass through at least one of the plurality of openings, at least some of the plurality of incident light beams overlapping each other; acquire a second image representing the subject from the first image using a transfer function corresponding to the plurality of openings; and acquire information on the subject using the second image.

The plurality of openings may have at least one of a linear pattern or a nonlinear pattern.

The processor may be configured to control the electronic device to identify a fingerprint on the subject using the second image.

The processor may be configured to control the electronic device to identify information on a valley and a peak of the fingerprint using the second image.

The processor may be configured to control the electronic device to identify a motion of the subject using the second image.

The transfer function may include a value for a degree to which at least some of a plurality of incident light beams by a coded pattern formed by the plurality of openings overlap each other.

The processor may configured to control the electronic device to: acquire a plurality of images using a plurality of light beams for each of specific objects which pass through at least one of the plurality of openings, at least some of the plurality of light beams overlapping each other; and acquire the transfer function, based on a relationship between a specific value corresponding to each of the specific objects and a value for each of the plurality of images.

The specific objects may include objects having different shapes and/or brightnesses.

The processor may be configured to control the electronic device to acquire the plurality of images for at least one object among the specific objects, based on a change of height between the at least one object and the display.

The image sensor may be in direct contact with the display.

The processor may be configured to control the electronic device to: output, through the display, light beams of a first type having a specific pattern; acquire a third image using first light beams reflected by a reflector outside the display and passing through at least one of the plurality of openings among the light beams of the first type, at least some of the first light beams overlapping each other; and acquire the transfer function based on a relationship between a specific value corresponding the light beams of the first type and a value for the third image.

The processor may be configured to control the electronic device to: output, through the display, light beams of a second type having a specific pattern instead of the light beams of the first type; acquire a fourth image using second light beams reflected by the reflector outside the display and passing through at least one of the plurality of openings among the light beams of the second type, at least some of the second light beams overlapping each other; and acquire the transfer function further based on a relationship between a specific value corresponding the light beams of the second type and a value for the fourth image.

The processor may be configured to control the electronic device to: acquire, based on a change of height between the reflector and the display, a fifth image using third light beams reflected by the reflector outside the display and passing through at least one of the plurality of openings among the light beams of the first type, at least some of the third light beams overlapping each other; and acquire the transfer function further based on a relationship between the specific value corresponding the light beams of the first type and a value for the fifth image.

The processor may be configured to control the electronic device to: acquire, through at least one first element corresponding to a first color included in the display, a first color image by outputting the light beams of the first type having the first color, and by sensing, by the image sensor, the light beams having the first color and reflected by the reflector; acquire, through at least one second element corresponding to a second color included in the display, a second color image by outputting the light beams of the first type having the second color, and by sensing, by the image sensor, the light beams having the second color and reflected by the reflector; and acquire a transfer function making it possible to identify depth information of the subject, based on a difference between the first color image and the second color image.

The processor may be configured to control the electronic device to: output, through the display, a plurality of light beams corresponding to a specific color; and identify depth information of the subject using a difference in brightness between light beams sensed by the image sensor when the plurality of light beams are reflected by the subject.

The display may include an organic light-emitting diode (OLED).

A method of operating an electronic device according to various example embodiments may include: acquiring, through an image sensor of the electronic device, a first image using a plurality of incident light beams for a subject which pass through at least one of a plurality of patterned openings, at least some of the plurality of incident light beams overlapping each other; acquiring a second image representing the subject from the first image using a transfer function corresponding to the plurality of openings; and acquiring information on the subject using the second image.

The plurality of openings may have at least one of a linear pattern or a nonlinear pattern.

The operation of acquiring information on the subject may include identifying a fingerprint on the subject using the second image.

The method of operating the electronic device may further include identifying information on a valley and a peak of the fingerprint using the second image.

The operation of acquiring information on the subject may include identifying motion of the subject using the second image.

The transfer function may include a value for a degree to which at least some of a plurality of incident light beams by a coded pattern formed by the plurality of openings overlap each other.

The method of operating an electronic device may further include: acquiring a plurality of images using a plurality of light beams for each of specific objects which pass through at least one of the plurality of openings, at least some of the plurality of light beams overlapping each other; and acquiring the transfer function, based on a relationship between a specific value corresponding to each of the specific objects and a value for each of the plurality of images.

The operation of acquiring the plurality of images may further include acquiring the plurality of images using a plurality of light beams for each of the specific objects having different shapes and/or brightnesses.

The operation of acquiring the plurality of images may include acquiring the plurality of images for at least one object among the specific objects using a plurality of light beams acquired based on a change of height between the at least one object and the display.

A non-transitory computer-readable recording media according to various embodiments may store a program that when executed, causes an electronic device to perform operations comprising: acquiring, through an image sensor of the electronic device, a first image using a plurality of incident light beams for a subject which pass through at least one of a plurality of patterned openings, at least some of the plurality of incident light beams overlapping each other; acquiring a second image representing the subject from the first image using a transfer function corresponding to the plurality of openings; and acquiring information on the subject using the second image.

Each of the components of the electronic device according to the disclosure may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the disclosure may be combined to form a single entity, and thus, may equivalently execute functions of the corresponding elements prior to the combination.

The various example embodiments disclosed herein are provided merely to easily describe technical details of the disclosure and to help the understanding of the disclosure, and are not intended to limit the scope of the disclosure. Therefore, it should be understood that all modifications and changes or modified and changed forms based on the technical idea of the disclosure fall within the scope of the disclosure including the appended claims and their equivalents.

What is claimed is:

1. An electronic device comprising:
   an image sensor including a plurality of photodiodes;
   a display disposed above the image sensor and including a plurality of patterned openings spaced between light emitting elements of the display; and
   a processor,
   wherein the processor is configured to control the electronic device to:
   acquire, through the image sensor, a first image using a plurality of incident light beams for a subject which pass through at least one of the plurality of openings, at least some of the plurality of incident light beams overlapping each other;
   acquire a second image representing the subject from the first image using a transfer function corresponding to the plurality of openings;
   output, through the display, a plurality of light beams corresponding to a specific color;
   identify depth information of the subject using at least a difference in brightness between light beams sensed by the image sensor based on the plurality of light beams being reflected by the subject; and
   acquire information on the subject using the second image and the depth information of the subject.

2. The electronic device of claim 1, wherein the plurality of openings include at least one of a linear pattern or a nonlinear pattern.

3. The electronic device of claim 1, wherein the processor is configured to control the electronic device to:
   identify a fingerprint on the subject using the second image.

4. The electronic device of claim 3, wherein the processor is configured to control the electronic device to:
   identify information on a valley and a peak of the fingerprint using the second image.

5. The electronic device of claim 1, wherein the processor is configured to control the electronic device to:
   identify a motion of the subject using the second image.

6. The electronic device of claim 1, wherein the transfer function includes a value corresponding to a degree to which at least some of a plurality of incident light beams passing through a coded pattern formed by the plurality of openings overlap each other.

7. The electronic device of claim 1, wherein the processor is configured to control the electronic device to:
   acquire a plurality of images using a plurality of light beams for each of specific objects which pass through at least one of the plurality of openings, at least some of the plurality of light beams overlapping each other; and
   acquire the transfer function based on a relationship between a specific value corresponding to each of the specific objects and a value for each of the plurality of images.

8. The electronic device of claim 7, wherein the specific objects include objects having different shapes and/or brightnesses.

9. The electronic device of claim 7, wherein the processor is configured to control the electronic device to:
   acquire the plurality of images for at least one object among the specific objects based on a change of height between the at least one object and the display.

10. The electronic device of claim 1, wherein the image sensor is in direct contact with the display.

11. An electronic device comprising:
    an image sensor including a plurality of photodiodes;
    a display including a plurality of patterned openings; and
    a processor,
    wherein the processor is configured to control the electronic device to:
    acquire, through the image sensor, a first image using a plurality of incident light beams for a subject which pass through at least one of the plurality of openings, at least some of the plurality of incident light beams overlapping each other;

acquire a second image representing the subject from the first image using a transfer function corresponding to the plurality of openings;
acquire information on the subject using the second image;
output, through the display, light beams of a first type having a specific pattern;
acquire a third image using first light beams reflected by a reflector outside the display and passing through at least one of the plurality of openings among the light beams of the first type, at least some of the first light beams overlapping each other; and
acquire the transfer function based on a relationship between a specific value corresponding the light beams of the first type and a value for the third image.

12. The electronic device of claim 11, wherein the processor is configured to control the electronic device to:
output, through the display, light beams of a second type having a specific pattern instead of the light beams of the first type;
acquire a fourth image using second light beams reflected by the reflector outside the display and passing through at least one of the plurality of openings among the light beams of the second type, at least some of the second light beams overlapping each other; and
acquire the transfer function further based on a relationship between a specific value corresponding the light beams of the second type and a value for the fourth image.

13. The electronic device of claim 11, wherein the processor is configured to control the electronic device to:
acquire, based on a change of height between the reflector and the display, a fifth image using third light beams reflected by the reflector outside the display and passing through at least one of the plurality of openings among the light beams of the first type, at least some of the third light beams overlapping each other; and
acquire the transfer function further based on a relationship between the specific value corresponding the light beams of the first type and a value for the fifth image.

14. The electronic device of claim 11, wherein the processor is configured to control the electronic device to:
acquire, through at least one first element corresponding to a first color included in the display, a first color image by outputting the light beams of the first type having the first color, and by sensing, by the image sensor, the light beams having the first color and reflected by the reflector;
acquire, through at least one second element corresponding to a second color included in the display, a second color image by outputting the light beams of the first type having the second color, and by sensing, by the image sensor, the light beams having the second color and reflected by the reflector; and
acquire a transfer function making it possible to identify depth information of the subject, based on a difference between the first color image and the second color image.

15. A method of operating an electronic device, the method comprising:
acquiring, through an image sensor of the electronic device disposed below a display of the electronic device including a plurality of patterned openings spaced between light emitting elements of the display, a first image using a plurality of incident light beams for a subject which pass through at least one of a plurality of patterned openings of a display included in the electronic device, at least some of the plurality of incident light beams overlapping each other;
acquiring a second image representing the subject from the first image using a transfer function corresponding to the plurality of openings;
outputting, through the display, a plurality of light beams corresponding to a specific color;
identifying depth information of the subject using a difference in brightness between light beams sensed by the image sensor based on the plurality of light beams being reflected by the subject; and
acquiring information on the subject using the second image and the depth information of the subject.

16. The method of claim 15, wherein the acquiring of information about the subject includes:
identifying a fingerprint on the subject using the second image.

17. The method of claim 16, further comprising:
identifying information on a valley and a peak of the fingerprint using the second image.

18. The method of claim 15, wherein the transfer function includes a value for a degree to which at least some of a plurality of incident light beams passing through a coded pattern formed by the plurality of openings overlap each other.

19. The method of claim 15, further comprising:
acquiring a plurality of images using a plurality of light beams for each of specific objects which pass through at least one of the plurality of openings, at least some of the plurality of light beams overlapping each other; and
acquiring the transfer function based on a relationship between a specific value corresponding to each of the specific objects and a value for each of the plurality of images.

* * * * *